(12) United States Patent
Szalay et al.

(10) Patent No.: US 12,007,979 B2
(45) Date of Patent: Jun. 11, 2024

(54) SYSTEMS AND METHODS FOR DATA CONSISTENCY AND ALIGNMENT IN DATA ANALYTICS PLATFORMS

(71) Applicant: CS Disco, Inc., Austin, TX (US)

(72) Inventors: Jozsef Szalay, Austin, TX (US); Sergei Kozyrenko, Austin, TX (US)

(73) Assignee: CS DISCO, INC., Austin, TX (US)

(*) Notice: Subject to any disclaimer, the term of this patent is extended or adjusted under 35 U.S.C. 154(b) by 0 days.

(21) Appl. No.: 17/841,508

(22) Filed: Jun. 15, 2022

(65) Prior Publication Data

US 2023/0409557 A1    Dec. 21, 2023

(51) Int. Cl.
*G06F 16/23* (2019.01)

(52) U.S. Cl.
CPC .................. *G06F 16/2365* (2019.01)

(58) Field of Classification Search
CPC .............. G06F 16/2477; G06F 16/248; G06F 2221/2151; G06F 16/2365

USPC .................. 707/725, 741, 758, 769
See application file for complete search history.

(56) References Cited

U.S. PATENT DOCUMENTS

| | | | | |
|---|---|---|---|---|
| 5,551,025 A | * | 8/1996 | O'Reilly | H04Q 3/0062 707/999.107 |
| 2004/0019676 A1 | * | 1/2004 | Iwatsuki | H04L 69/329 709/224 |
| 2004/0078228 A1 | * | 4/2004 | Fitzgerald | G06Q 10/10 705/2 |
| 2013/0179071 A1 | * | 7/2013 | Camacho | G01C 21/20 701/468 |
| 2020/0104737 A1 | * | 4/2020 | Abaci | G06N 20/00 |

* cited by examiner

*Primary Examiner* — Phong H Nguyen
(74) *Attorney, Agent, or Firm* — Sprinkle IP Law Group

(57) ABSTRACT

Systems and methods for providing consistent and time aligned data from arbitrary sets of data in a data analytics platform are disclosed. Embodiments of such systems and methods may format datasets comprising data received from various data sources to facilitate the provisioning of time aligned data from these datasets based on a time specified in a query for one or more of those datasets.

18 Claims, 12 Drawing Sheets

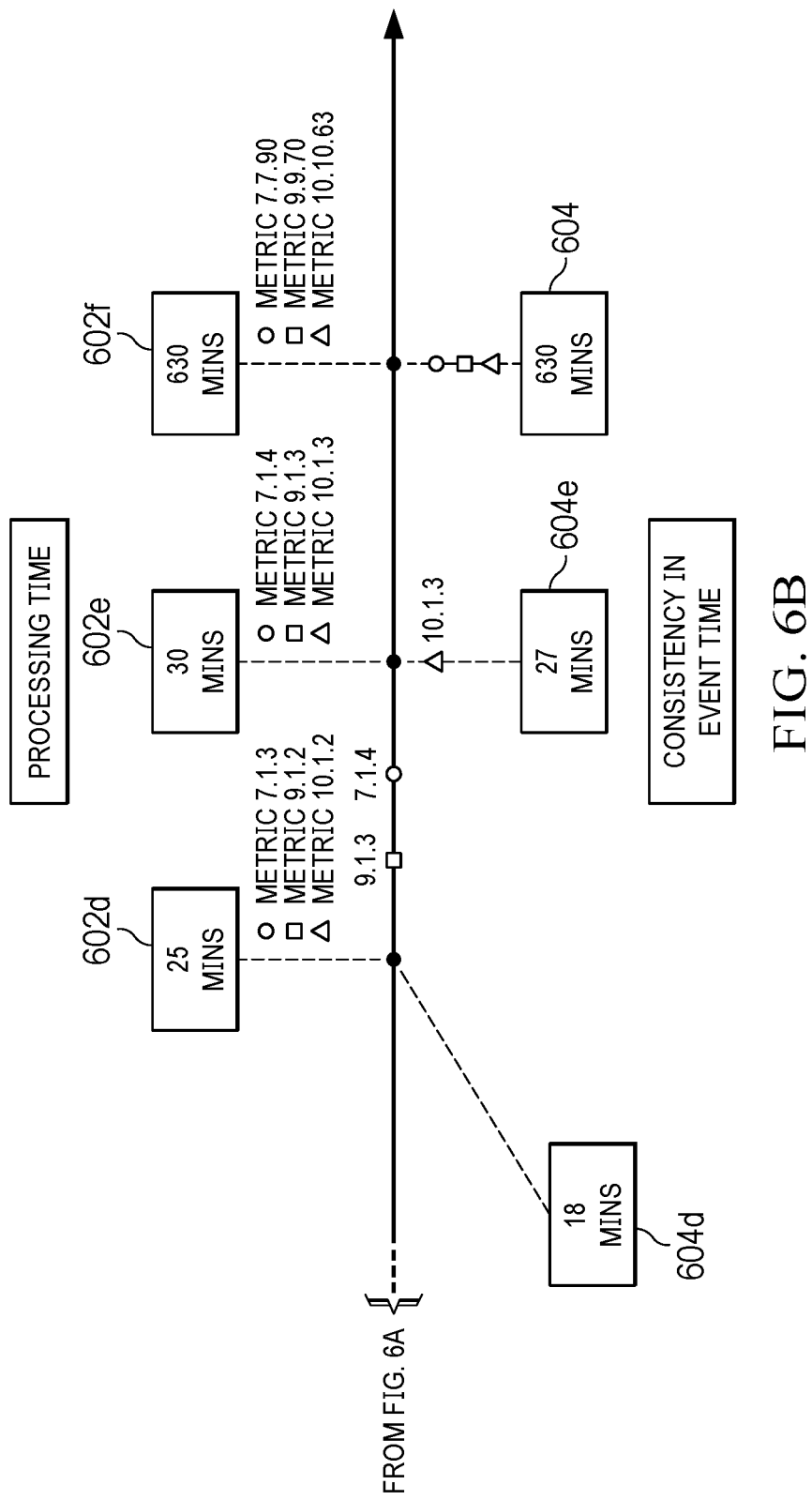

SYSTEMS AND METHODS FOR DATA CONSISTENCY AND ALIGNMENT IN DATA ANALYTICS PLATFORMS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to data storage, access, querying and analytics in a distributed networked computer environment. In particular, this disclosure relates to ensuring data consistency of data stored, accessed, queried, and analyzed in such a distributed networked computer environment. Even more specifically, this disclosure relates to ensuring data consistency through the time alignment of data from distinct datasets based on data acquired from across a distributed networked computer environment.

BACKGROUND

The current trend in enterprise scale computing is to increasingly implement enterprise's information technology systems according to a federated architecture comprising a set of distributed, networked systems and applications. This trend had been accelerated by the increasing availability and use of cloud based platforms to host instances of an enterprise's applications, services, or other functionality (collectively applications) whereby those applications be accessed over the network (e.g., the Internet) using browser based or proprietary applications residing on distributed systems (e.g., user devices such as desktop computers, smart phones, etc.).

Another current trend in enterprise scale computing is the increasing desire for more granular and detailed data analytics regarding activities associated with the enterprises applications themselves, and to access these data analytics (e.g., resulting data) in the context of the ecosystem of the enterprise's platform itself. Traditionally, a separation has been placed between accessing analytics data for the enterprise's application, and the enterprise's application platform itself. This is, at least in part, due to a technical separation of live data, which is the subject of constant change, and analytic data, which is generally copied from the live data and analyzed to generate reportable information. These traditional analytics thus usually require a user to leave the context of the enterprise's applications (e.g., the core applications providing the functionality of the enterprise) to look at such analytics data in a separate set of tools.

Accordingly, enterprises are increasingly incorporating data analytics in the context of the enterprise's platform or (e.g., core) applications themselves. These embedded analytics are used to deliver dynamic reporting, interactive data visualization or advanced analytics, directly in association with the enterprise's (e.g., core) applications and allow users to view data visualizations or dashboards in context—while interacting with the enterprise's platform itself. This immediacy makes embedded analytics more intuitive and likely to be used and viewed by users.

In any event, it is usually a data analytics platform that provides such data analytics, either as a standalone application or as part of the embedded analytics of an enterprise's platform. What is desired therefore, are systems and methods for improved data analytics platforms, including those that can improve the provisioning of embedded analytics.

SUMMARY

As discussed, enterprise platforms are increasingly implemented on a federated architecture comprising a set of distributed, networked systems and applications. Moreover, it is increasingly desired to provide granular and detailed data analytics regarding activities associated with the enterprises applications and platforms themselves. These embedded analytics are used to deliver dynamic reporting, interactive data visualization or advanced analytics, directly in association with the enterprise's (e.g., core) applications and allow users to view data visualizations or dashboards in context—while interacting with the enterprise's platform itself. For example, users of a document review system may desire to understand what data is being used, or how, and define related metrics. Additionally, such users may desire the ability to insert these data analytics (i.e. metric values) into the data review application interface in a contextual manner (e.g., in a desired interface or place in the workflow or at a desired time.).

The increasing use of federated architectures has, however, made the use of more complex data analytics and associated analytics platforms quite difficult. In particular, in such federated architectures data may be continually arriving from (e.g., hundreds or even thousands of) a variety of different distributed sources within the computing network in real-time. This data may be arriving asynchronously from these different distributed sources (e.g., at different time intervals). Moreover, the data itself may include data collected over (or according to) different time intervals.

Users of such enterprise applications desire to be able to determine and receive such analytics data in an intuitive and simple manner, and may have certain expectations with respect to this analytics data. Specifically, one of the expectations that users of such an enterprise platform may have is that the data accessed (e.g., using embedded analytics in the enterprise's platform) be consistent. In other words, that data presented together (e.g., in an interface) is from the same time (e.g., time or time period used here interchangeably) or corresponds to the same time. This is especially true for data (e.g., metrics) that are semantically related. Again, both the real-time and asynchronous nature of the collection and determination of such distinct data streams and the real-time and asynchrony nature of distributed access to such analytics data, makes meeting these expectations extremely difficult.

Previous attempts to address these time alignment issues have proved inadequate, as they are either highly context specific, could not be utilized in a federated environment, fail to address the real-time or embedded nature desired by such users (e.g., they required significant offline processing), or fail to maintain time alignment of the data such that time aligned data can be presented to users or utilized by other downstream applications or systems utilizing such data. To illustrate, many previous attempts to address these issues were implemented at the application level, by trying to determine or infer such time alignment windows through aggregations or data joins (e.g., SQL aggregations) embedded in the (e.g., stored procedures) used to manipulate the data. However, if the characteristics of the data (e.g., the timing or resolution of the data, or certain aspects of the data format) are altered, then these purpose built attempts fail and any resulting determinations from that data (e.g., determined metrics) will likewise skew or fail. As such alterations of the data is often under the control of the data sources themselves these purpose built individualized solutions are highly brittle, and are rendered useless when the data of an enterprise changes (or worse, such solutions may provide incorrect metrics without the enterprise realizing such metrics are incorrect).

What is desired therefore, are systems and methods for storing, accessing, requesting (querying), and analyzing data to maintain consistency of such data, including time alignment of such data.

To that end, among others, embodiments as disclosed herein are directed to ensuring data consistency through the time alignment of data from distinct datasets based on data acquired from across a distributed networked computer environment. These datasets may include datasets comprising data determined from data sources (referred to as sensors) distributed across an enterprise computing environment (referred to as bootstrap datasets); datasets (referred to as metric datasets) comprising metric data (data on a of quantitative or qualitative measure or assessment) determined from one or more bootstrap datasets, other metric datasets, or intermediate datasets comprising data derived from one or more bootstrap dataset, metric dataset or other intermediate dataset. These datasets may undergo transformations to produce data for other datasets and serve as sources for generating data including metric values as included in metric datasets. Thus, these datasets along with the relationships between them (e.g., a respective source dataset or transformations applied to one dataset resulting in another dataset) can comprise one or more (e.g., directed) acyclic graphs.

In particular, embodiments may maintain datasets that include data that is grouped or otherwise indexed according to a consistency window time (e.g., length or interval) for that dataset, the consistency time window defining the frequency at which data (e.g., data records, points, events or an instance of concrete, structured data, all used here interchangeably) are received from a corresponding data source (e.g., a sensor or the process that determines intermediate data or metrics). These groupings of data records are referred to as change sets. Each dataset may also be associated with a data resolution time, which defines the timing (e.g., the time between) the data records included in the dataset. This data resolution may be equal to or less than the consistency window time defined for the dataset.

Embodiments may thus store or format data in a manner that allows the arbitrary groups of data from these datasets to be time aligned, substantially without regard to the meaning of the actual data of the datasets themselves. In other words, arbitrary groups of this data may be specified (e.g., arbitrary metrics may be specified) and time aligned metric data from those datasets may be provided. Moreover, the data for the arbitrary group of metrics may be time aligned based on a particular reference time that may (or may not be) a current time.

This time aligned data may be provided in response to a query that may identify one or more datasets (or data included therein) for the query, such as for example, a set of metrics, along with a query time from which such data is desired. If no specific query time is defined in the query a current time (e.g., of the query) may be utilized as the query time. Data for each of those datasets (e.g., for the specified metrics) may be provided along with a query consistency (reference) time at which the provided metric data is time aligned. This reference time may be the closest time to the query time for which such time aligned data may be provided.

In one embodiment then, a data analytics system may include a processor and a data store, comprising a plurality of dataset definitions, each dataset definition including a consistency time window and a data resolution, wherein the consistency time window defines a first time interval at which data for a corresponding dataset is received from a corresponding data source associated with the dataset and the data resolution defines a second time interval between one or more data records included in the data received from the data source at the first time interval, and wherein each of the data records includes a value. The data store may also store a plurality of datasets, each dataset corresponding to one of the plurality of dataset definitions.

Put in another way, according to embodiments the consistency time window may be a time interval where, at the end of that time interval, data within a dataset is considered consistent according to a set of defined semantics (e.g., as defined by a user who defined such a dataset. A dataset can hold various data, including measurements of various parameters or metrics, such as the activities of users for one or more users. To illustrate one example of a consistency time window, a five minute consistency window may indicate that these measurements continue to arrive throughout such a five minute window and should not be reported out (e.g. via response to queries for such a dataset) until the measurements for the dataset (e.g., for the users being measured) arrives at the end of the five minute for that period. A new five minute window starts after the end of the previous window. Accordingly, it may be desired that queries on this dataset will always act on data that is considered consistent and complete for a given five minute window. A defining user (of the dataset) or an associated entity may thus not desire or cannot afford returning what it considers partial data.

Data resolution typically defines how often these data measurements are taken. In some cases, the more frequently data is collated the higher the resolution has to be. So, given the example above, if the data resolution is one minute, and assuming that measurements are flowing in at this data resolution interval, five data points will be received (e.g., for every user) within each five minute consistency time window.

The data analytics system can receive data from the data source corresponding to the dataset at the first time interval, the data comprising one or more data records at the second time interval and store the one or more received data records in the received data in change sets of the dataset, the change sets associated with a beginning time and an end time. At some point the data analytics system can receive a query comprising a query time, the query associated with the plurality of datasets. In response to receiving the query the data analytics system can evaluate all of the plurality of datasets to determine a reference time for the plurality of datasets based on the query time, the consistency time window of each dataset, and the data resolution of each dataset, wherein the reference time is a time that is closest in time to the query time of the query where the values for the plurality of datasets are time aligned. The value of each dataset at the reference time can be determined from the data record of that dataset associated with the reference time and the value of each dataset at the reference time and the reference time returned in response to the query.

In an embodiment, the consistency time window and the data resolution are different time intervals.

In certain embodiments the corresponding data source may comprise a data analytics application (e.g., executing on the data analytics platform) or may include a data source associated with a host application provided by a host application platform.

In one embodiment, evaluating all of the plurality of datasets to determine a reference time for the plurality of datasets based on the query time can include determining a consistency time for each dataset based on the query time and adjusting the consistency times for each dataset by the data resolution for that dataset until the consistency times for each dataset are time aligned. Additionally, determining such a reference time may also occur in response to transformations that may produce additional data, such as may be required for producing data stored in intermediate or metric datasets.

In a particular embodiment, determining the consistency time for each dataset comprises determining the change set of each dataset that comprises data closest in time to the query time and determining the consistency time for the dataset based on the determined change set.

Embodiments thus provide the advantages of providing a set of time aligned data (e.g., metrics or other data). Moreover, embodiments may allow the deterministic determination of such data, such that if data for a particular time or associated with a particular time has particular values when queried at a first time, that data will have the same values for that same particular time when queried at a second later time.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 6A and 6B are a block diagram of the processing of example datasets to provide time aligned data.

DETAILED DESCRIPTION

Figure 1A:
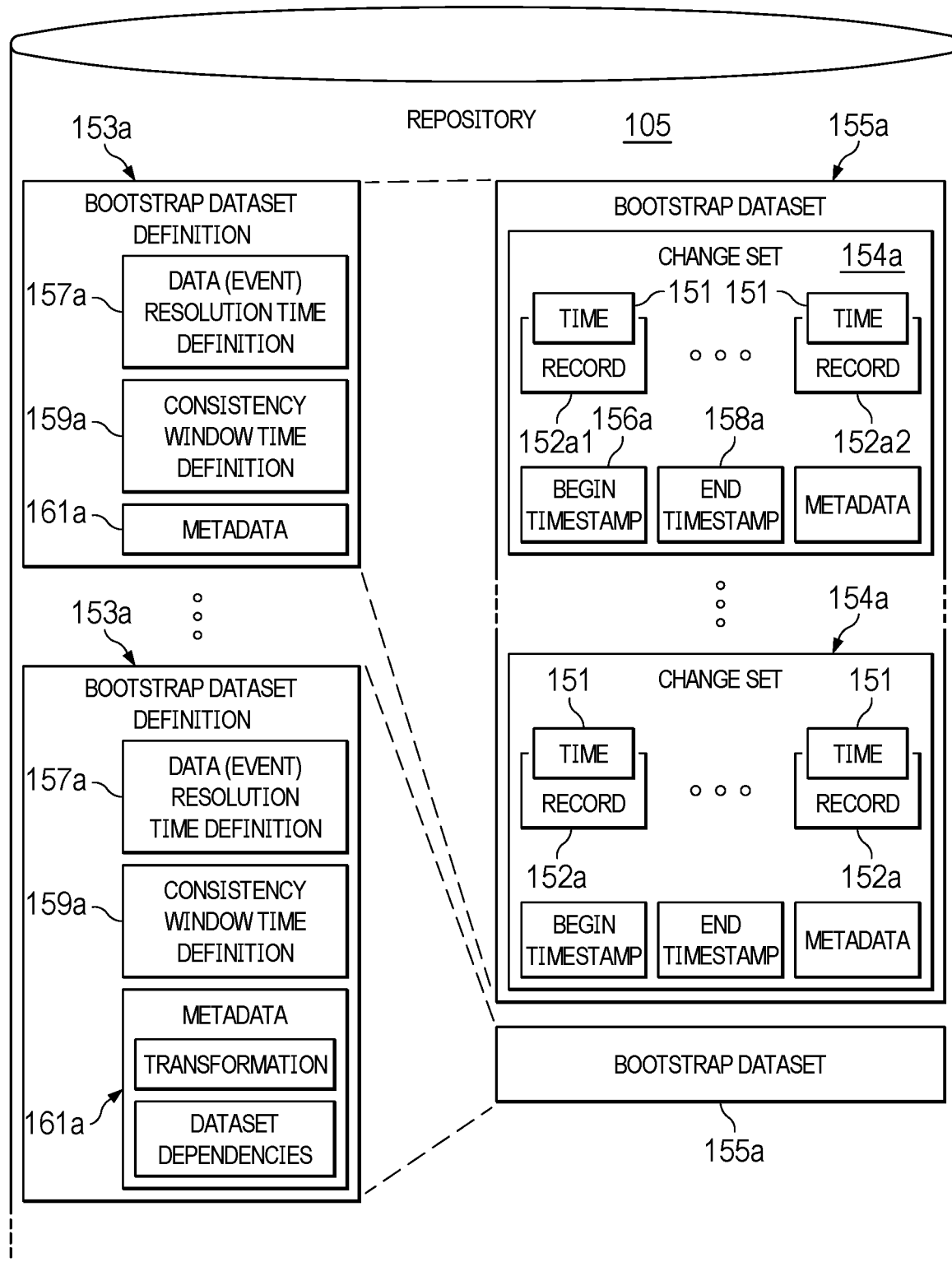
FIGS. 1A-1D are a block diagram of one embodiment of an architecture including a document analysis system.
Figure 1B:
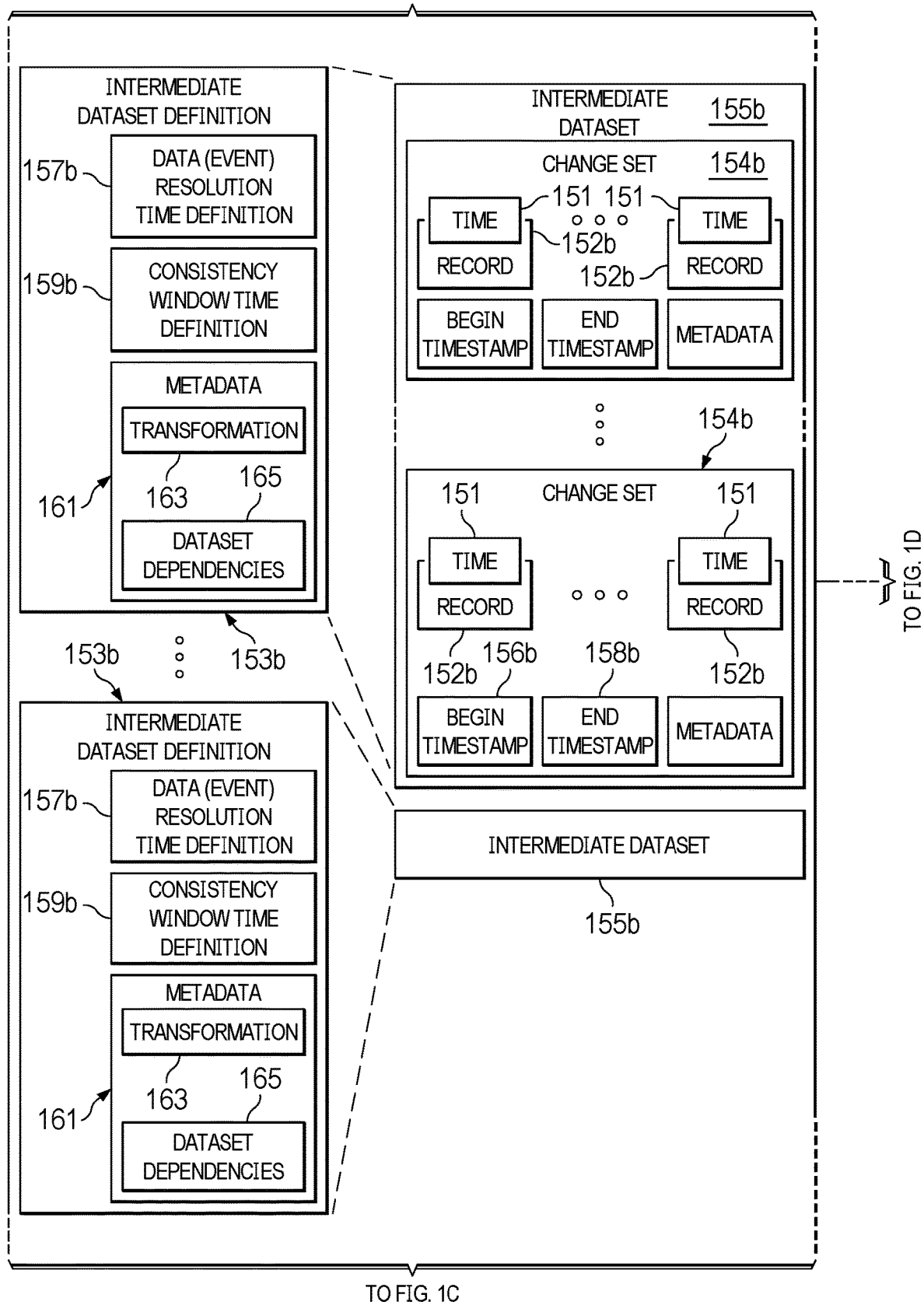
Figure 1C:
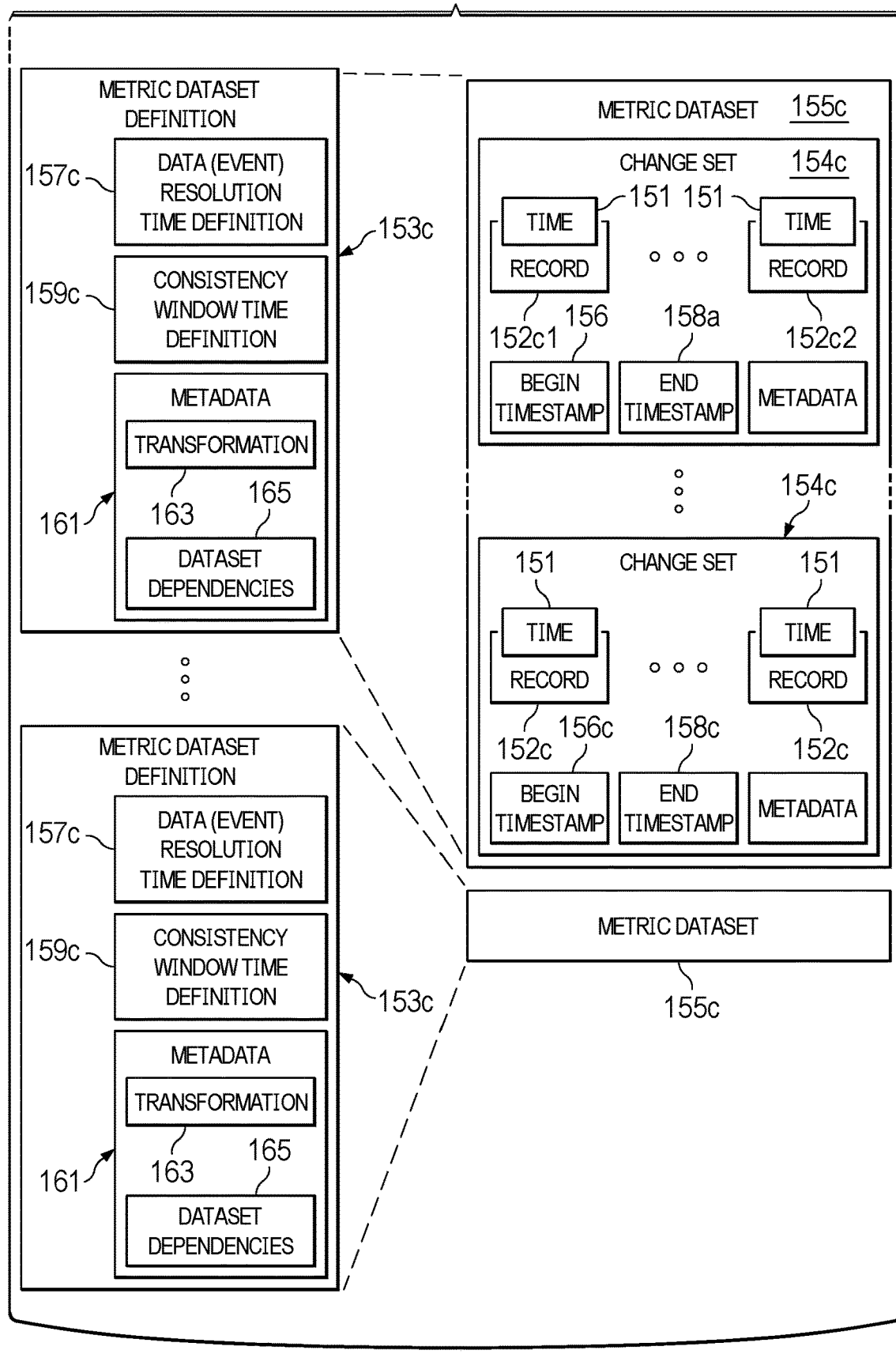
Figure 1D:
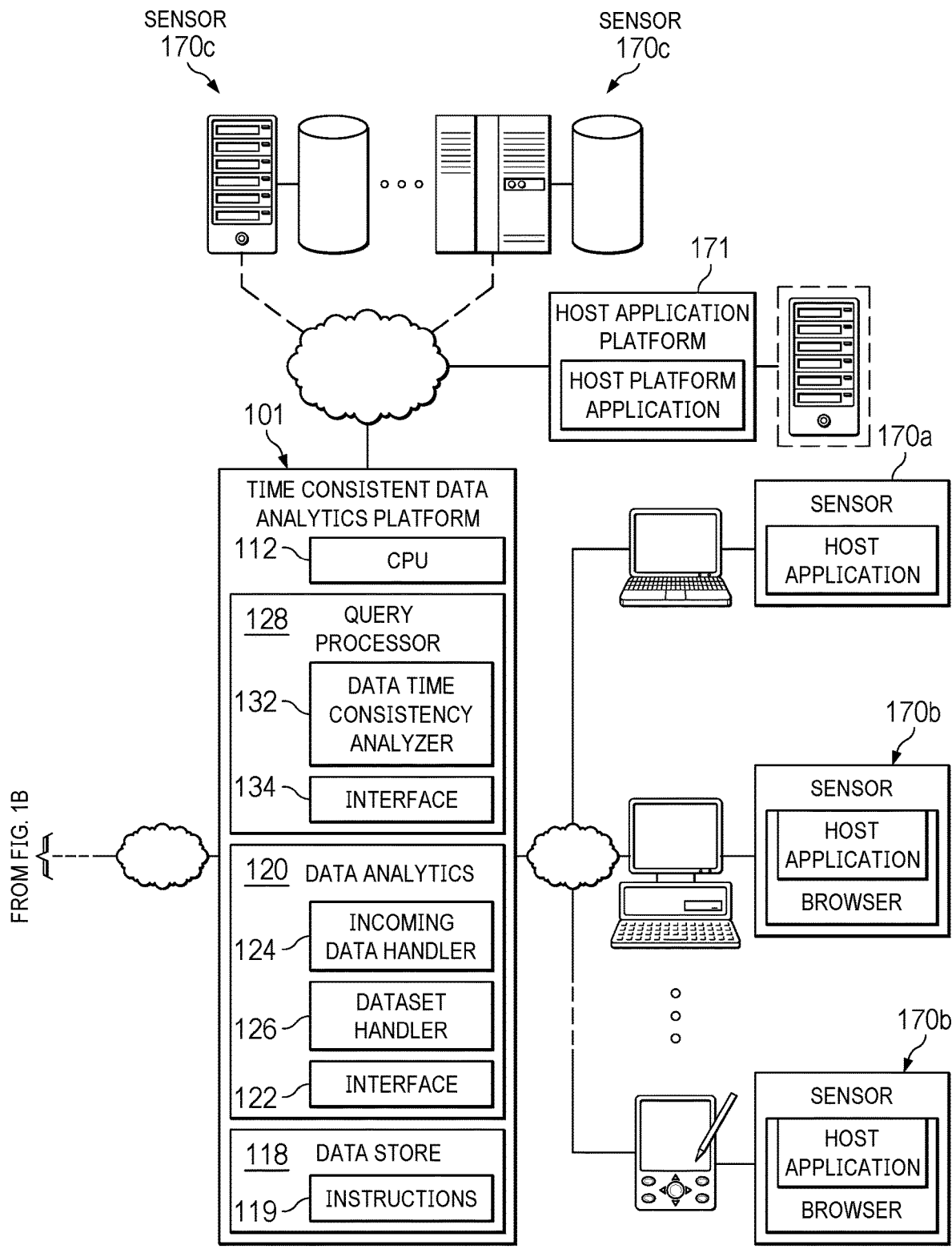

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in detail, it may be helpful to discuss some context around document analysis systems. As discussed, enterprise platforms are increasingly implemented on a federated architecture comprising a set of distributed, networked systems and applications. Moreover, it is increasingly desired to provide granular and detailed data analytics regarding activities associated with the enterprises applications and platforms themselves. These embedded analytics are used to deliver dynamic reporting, interactive data visualization or advanced analytics, directly in association with the enterprise's (e.g., core) applications and allow users to view data visualizations or dashboards in context—while interacting with the enterprise's platform itself.

The increasing use of federated architectures has, however, made the use of more complex data analytics and associated analytics platforms quite difficult. In particular, in such federated architectures data may be continually arriving from (e.g., hundreds or even thousands of) a variety of different distributed sources within the computing network in real-time. This data may be arriving asynchronously from these different distributed sources (e.g., at different time intervals). Moreover, the data itself may include data collected over (or according to) different time intervals. In addition, such data analytics platforms may determine many metrics or other datasets (intermediate datasets) from these datasets received from these distributed sources (referred to as bootstrap datasets).

Users of such enterprise applications desire to be able to determine and receive such analytics data in an intuitive and simple manner, and may have certain expectations with respect to this analytics data. Specifically, one of the expectations that users of such an enterprise platform may have is that the data accessed (e.g., using embedded analytics in the enterprise's platform) be consistent. In other words, that data presented together (e.g., in an interface) is from the same time (e.g., time or time period used here interchangeably) or corresponds to the same time. This is especially true for data (e.g., metrics) that are semantically related. Again, both the real-time and asynchronous nature of the collection and determination of such distinct data streams and the real-time and asynchrony nature of distributed access to such analytics data, makes meeting these expectations extremely difficult. For example, three different datasets with dissimilar time intervals may only rarely (relatively speaking) be aligned (e.g., datasets having 7, 9 and 10 minute intervals may only be time aligned every 7*9*10=630 minutes, or 10.5 hours).

For any dataset having relatively prime time intervals [w1, w2, . . . , wn], they may only be time aligned every w1* w2* . . . *wn, More generally, a group of datasets will only be time aligned every LCM (Least Common Multiple) of all the time intervals at which those datasets are received (e.g., if the data resolution of the datasets equals the consistency time windows for those datasets).

To illustrate a simple example, an analytics platform may receive temperature data from one source at eight minute intervals where the temperature data includes temperatures measured every two minutes. Thus, every eight minutes the data analytics platform may receive eight minutes of data, with a two minute resolution (e.g., four temperature measurements, each taken two minutes apart, covering the eight minutes). The analytics platform may also receive humidity data from another source at nine minute intervals where the humidity data includes humidity values measured every three minutes, thus every nine minutes the data analytics platform receives nine minutes of data, with a three minute resolution (e.g., three humidity measurements, each taken three minutes apart covering the nine minutes).

Here, data alignment may be based on the dataset resolution provided that all involved datasets have consistent data at the aligned time. Continuing with the example above, the datasets in the example align at six minute intervals (2*3 the data resolutions of the respective datasets), however, at the first alignment time of 6 minutes (T6) the humidity data is incomplete (e.g., because its consistency time window is 9 minutes and data has not yet been received), therefore there is no alignment at T6. When the humidity data becomes complete at the ninth minute (T9, when data is received according to the consistency time window), there is no alignment across the two datasets at minute six (T6) (e.g., there was alignment at T6, it could not be reported since confirming humidity data may not have been received until T9). When another change set for temperature is received at minute 16 (T16 (2*8)), the second change set for humidity has not yet been received (according to the consistency time window), so the only alignment of the datasets at T16 remains at minute six (T6). By minute 18 (T18 (2*9)) however, the second change set for humidity has been received, so the datasets now align at T6 and minute 12 (T12). Continuing this pattern, at T27 the two datasets may align at T6, T12, T18, T24. As can be seen then, if a user requests both temperature and humidity data for a particular time (e.g., for a particular hour or the current time) it will be difficult to provide both humidity and temperature for the requested time. More generally, it will be difficult to provide time aligned temperature and humidity data (e.g., temperature and humidity data corresponding to the same time) at all.

It may be helpful here to illustrate an example context of types of enterprise applications and data analytics in which such time alignment may be desired. It will be understood, however, that such examples are provided by way of illustration without loss of generality, and embodiments as disclosed herein may be used in association with almost any architecture, applications or data desired and such uses and embodiments are fully contemplated herein. With that understanding, one particular enterprise application where such analytics may prove particularly useful is in the document review and analysis space.

More particularly, in the modern world, the vast majority of documents that are being created, utilized and maintained are in electronic format. A number of different situations commonly arise that require an analysis or identification of certain relevant electronic documents from a relatively large pool of available electronic documents. These types of search problems crop up in a wide variety of contexts. For example, in litigation, an entity's documents may need to be reviewed in order to identify documents that may be relevant to one or more issues in a litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what is to be shared with opposite parties. Additionally, during the course of the litigation each party may continually review those documents produced by the opposing party to locate documents relevant to the case at hand.

Litigation thus represents a microcosm of a more general problem raised by the high volume, and increasing presence and use of electronic documents across a variety of different contexts. Namely, how can a large volume of electronic documents be understood, reviewed, or searched in order that documents relevant to a particular topic or user's interest may be located.

To aid users in resolving these problems, a document analysis system may be provided in a given electronic context. A document analysis, document review, information retrieval, or search system (which all will be utilized here substantially interchangeably) is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

In the legal domain, as well as other domains, these document analysis systems may be required to review and analyze a large corpus of documents. In some of the instances it may be desired to review and code the documents of a corpus according to a list of classification criteria that may be arbitrarily nuanced or complex. One standard approach to this task is to engage a team of human reviewers to utilize the document analysis system to examine each document in the corpus in order to apply the correct codes (or labels) to those documents.

Accordingly, users of these document review systems may desire to understand what data is being used or how and define related metrics. Additionally, such users may desire the ability to insert these data analytics (i.e. metric values) into the data review application interface in a contextual manner (e.g., in a desired interface or place in the workflow or at a desired time.). For example, users of such a document analysis system may desire to determine metrics related to how long one or more users have spent reviewing documents in a time period (e.g., in the last month), how many documents (e.g., pages) has a user reviewed in a time period (e.g., in the last four hours), what is the average time spent per user in a particular database of documents, how much data has the user stored had in a database over a particular time period, what is the bill going to be for a particular time period, or other metrics. The ability to track time spent by reviewers in document review avows users of a document review system to assess productivity or performance or take corrective action more effectively. In addition, tracking time in the app allows customers to reconcile billing entries for review activity with actual time spent using the document review system. But again, as discussed with respect to data analytics platforms generally, these metrics are seasonally less useful if they are not time aligned or cannot be evaluated in concert because of the lack of ability to time align such metrics.

Previous attempts to address these time alignment issues have proved inadequate, as they are either highly context specific, could not be utilized in a federated environment, fail to address the real-time or embedded nature desired by such users (e.g., they required significant offline processing), or fail to maintain time alignment of the data such that time aligned data can be presented to users or utilized by other downstream applications or systems utilizing such data. To illustrate, many previous attempts to address these issues were implemented at the application level, by trying to determine or infer such time alignment windows through aggregations or data joins (e.g., SQL aggregations) embedded in the (e.g., stored procedures) used to manipulate the data. However, if the characteristics of the data (e.g., the timing or resolution of the data, or certain aspects of the data format) are altered, then these purpose built attempts fail and any resulting determinations from that data (e.g., determined metrics) will likewise skew or fail. As such alterations of the data is often under the control of the data sources themselves these purpose built individualized solutions are highly brittle, and are rendered useless when the data of an enterprise changes (or worse, such solutions may provide incorrect metrics without the enterprise realizing such metrics are incorrect).

What is desired therefore, are systems and methods for storing, accessing, requesting (querying), and analyzing data to maintain consistency of such data, including time alignment of such data.

To that end, among others, embodiments as disclosed herein are directed to ensuring data consistency through the time alignment of data from distinct datasets based on data acquired from across a distributed networked computer environment. These datasets may include datasets comprising data determined from data sources (referred to as sensors) distributed across an enterprise computing environment (referred to as bootstrap datasets); datasets (referred to as metric datasets) comprising metric data (data on a of quantitative or qualitative measure or assessment) determined from one or more bootstrap datasets, other metric datasets, or intermediate datasets comprising data derived from one or more bootstrap dataset, metric dataset or other intermediate dataset. These datasets may undergo transformations to produce data for other datasets and serve as sources for generating data including metric values as included in metric datasets. Thus, these datasets along with the relationships between them (e.g., a respective source dataset or transformations applied to one dataset resulting in another dataset) can comprise one or more (e.g., directed) acyclic graphs.

Certain of these datasets may be stored or metric datasets may be accessed quite frequently (e.g. metric datasets) and may thus be optimized for certain types of access or fast retrieval. Specifically, the datasets may be persisted in a data store or materialized in cache where the data may be sufficiently denormalized in order to avoid having to rely on data external to the dataset itself to process the data of the dataset. Moreover, the dataset may be partitioned and sub-partitioned into distinct sub-collections to further improve read performance. Such a dataset or the storage of the dataset may support queries with filtering conditions, rollups with aggregations and sorting, but no joins. Dimensions and filter attributes for the data of the dataset may be included so that the data (e.g., the supported metrics can be evaluated, for example, dimensionalized and filtered, to get desired values).

In particular, embodiments may maintain datasets that include data that is grouped or otherwise indexed according to a consistency window time (e.g., length or interval) for that dataset, the consistency time window defining the frequency at which data (e.g., data records, points, events or an instance of concrete, structured data, all used here interchangeably) are received from a corresponding data source (e.g., a sensor or the process that determines intermediate data or metrics). In other words, the consistency window time may define a length of time (e.g., five minutes, eight minutes, 30 seconds, etc.) between receiving data from the data source for the dataset. These groupings of data records are referred to as change sets. In some cases, data (e.g. measurements) may actually be received more frequently (e.g., they may be received at the data resolution interval), however, such data may be stored or otherwise not regarded as complete or otherwise regarded as a complete change set until an end of a consistency time window. Each change set thus includes the data records (events, data points, etc.) for that dataset for each consistency window time for the corresponding dataset. The data records received from the data source can be assigned to a change set based on a timestamp associated with the individual data record. Thus, typically, a change set comprises the data (e.g., data records) received (e.g., from the data source) at the expiration of each consistency window time interval.

The change set can thus be associated with a start or beginning time (timestamp or other marker) of the time covered by that change set (e.g., or the data records included in that change set) and an end time (timestamp or other marker) of the time covered by that change set (e.g., or the data records included in that change set, such as the timestamp of the first data record as the beginning time of the change set and the timestamp of the last data records as the end time of the change set), such that the time between the beginning time and the end time of the change set is substantially equal to the consistency window time for that dataset. These change sets may be considered a set or non-overlapping sets with respect to their beginning time and end times. These beginning and end times for each change set may be measured or defined relative to a clock or using an anchor time (e.g., a UNIX time, or Epoch or POSIX time, time since midnight of the current day, such that a time can be a combination of a date and time, etc.). Each dataset may also be associated with a data resolution time, which defines the timing (e.g., the time between) the data records included in the dataset. This data resolution may be equal to or less than the consistency window time defined for the dataset. In certain embodiments there may be a minimum data resolution time such as one minute or the like. As but one example, if a consistency window time (referred to as C herein) is five minutes, the consistency windows (and thus the start tunes and end times for the respective change sets for that dataset) for every hour may be (0, 5], (5, 10], (10, 15], . . . (55, 60] etc. The data resolution time for the dataset thus could be between 1 to 5 minutes (e.g., depending on the data received at each five minute interval.

Embodiments may thus store or format data in a manner that allows the arbitrary groups of data from these datasets to be time aligned, substantially without regard to the meaning of the actual data of the datasets themselves. In other words, arbitrary groups of this data may be specified (e.g., arbitrary metrics may be specified) and time aligned metric data from those datasets may be provided. Moreover, the data for the arbitrary group of metrics may be time aligned based on a particular reference time that may (or may not be) a current time.

This time aligned data may be provided in response to a query that may identify one or more datasets (or data included therein) for the query, such as for example, a set of metrics, along with a query time from which such data is desired. If no specific query time is defined in the query a current time (e.g., of the query) may be utilized as the query time. Data for each of those datasets (e.g., for the specified metrics) may be provided along with a query consistency (reference) time at which the provided metric data is time aligned. This reference time may be the closest time to the query time for which such time aligned data may be provided. In particular, embodiments can determine the change set of each dataset identified or otherwise determined for the query, where the determined change set for a dataset includes those data records associated with that query time or from a closest point in time to the query time (the reference time).

Embodiments thus provide the advantages of providing a set of time aligned data (e.g., metrics or other data). Moreover, embodiments may allow the deterministic determination of such data, such that if data for a particular time or associated with a particular time has particular values when queried at a first time, that data will have the same values for that same particular time when queried at a second later time.

Looking now at FIGS. 1A-1D then, a block diagram of one embodiment of a distributed computing environment including time consistent data analytics platform (referred to as a data analytics platform herein for ease of reference) is depicted. The time consistent data analytics platform 101 is part of computing environment 100 including a data repository 105, a host application platform 171, and one or more sensors 170 serving as data sources for data analytics platform 101. Repository 105 may comprise a file server or database system or other storage mechanism remotely or locally accessible by document analysis system 101 which, according to an embodiment, may be almost any SQL or NoSQL platform such as MongoDB, Elasticsearch or the like.

Host application platform 171 comprises a computing platform (e.g., physical or virtual servers) providing an application utilized by various users. For example, such a host application platform 171 may provide a document analysis system to allow users to analyze, review or navigate the information, or search the electronic information to return electronically stored information responsive to a search (also referred to as a query). Such a document analysis system may also provide a document analysis application to allow users to access the document analysis system to examine documents in a corpus in order to review documents and tag (e.g., apply codes or labels to) those documents. Thus, a user at a computing device may access the host application platform 171 through a host application (e.g., a standalone or browser based application). The user at the computing device can then perform actions related to the host application In some embodiments, data analytics platform 101 may provide data analytics in association with the host application platform 171. Specifically, data analytics platform 101 may provide data in association with the host application, including data on the usage of the host application itself, in the context of the host application. Thus, users at a computing device or accessing the host application platform 171 may access data (e.g., analytics data such as determined metrics related to the host application or host application platform) determined at the data analytics platform 101 using the host application or host application platform 171 itself.

In the depicted embodiment data analytics platform 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media, or the like. Data analytics platform 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide data analytics application 120 and query processor 128. Data analytics application 120 and query processor 128 may be implemented on the same computing systems or can be distributed across multiple computing systems, platforms or physical or virtual servers. Again, it will be noted here that while embodiments described and depicted herein may include a deployment of a data analytics platform on a physical computing device, other embodiments may include the data analytics platform deployed as a service on, for example, a cloud computing environment or otherwise deployed without loss of generality.

Those of skill in the art will appreciate that document analysis system 101 shown in FIGS. 1A-1D is merely an example of a computing system and embodiments of a data analytics platform 101 may be implemented using other computing systems (e.g., desktop computers, laptops, mobile computing devices, services platforms, cloud computing platforms or other computing devices or platforms with adequate processing and memory) including multiple computers acting together to provide a data analytics platform (e.g., a cluster of servers or other computing devices connected by a network acting together to provide the data analytics platform).

Data analytics platform 101 may perform data analytics based on data from various data sources (referred to as sensors). According to embodiments, data analytics application 120 of the data analytics platform 101 receives data from various data sources 170 throughout the distributed computer environment 100. These data sources 170 can include third party data sources 170c that are not affiliated with, or external to, the enterprise computing environment from which data can be requested or otherwise received; or data sources 170c internal to the enterprise computing environment 100 associated with the host application platform 171 from which data can be requested or otherwise received. Thus, data analytics application 120 may request or receive data from such data sources 170*c* (e.g., through interface 122) at the data analytics platform 101.

The data sources 170 may also include user computers (or applications thereon) that are accessing the host application (e.g., the document review application) (e.g., data sources 170*b*). Thus, for example, as a user at a user device is reviewing and tagging document using a host application for document analysis provided by the host application platform (e.g., a document review or analysis application), data may be sent from that user device by the document review application (or a browser on which that document review application is running) to the data analytics application 120 (e.g., through interface 122) at the data analytics platform 101.

As may be realized, data may thus be continually arriving from (e.g., hundreds or even thousands of) a variety of different distributed sources 170 within the enterprise environment where this data may be arriving asynchronously from these different distributed sources (e.g., at different time intervals). Moreover, the data from the data source itself may include data collected over (or according to) different time intervals. In other words, data may arrive from a data source at a particular time interval, where the data arriving at that time interval may include data records (points, events, etc.) determined at another time interval (which may be the same or different than the time interval at which the data from the data source is arriving or sent to the data analytics platform). Thus, data may arrive from a different data sources 170 at different time and the arriving data may include data points (records) having a certain resolution (e.g., determined at a particular time interval, which may be the same, or different, than the interval at which the data is provided or obtained from the data source 170. To reiterate the simple example above, an analytics platform may receive temperature data from one data source at eight minute intervals (the time interval at which data arrives or is obtained) where the temperature data includes temperatures measured every two minutes (the time interval or resolution of the data records included in the arriving data). Thus, every eight minutes the data analytics platform may receive eight minutes of data, with a two minute resolution (e.g., four temperature measurements, each taken two minutes apart, covering the eight minutes).

The data received from these sensors 170 may be stored in bootstrap datasets 155*a* by incoming data handler 124. These bootstrap datasets 155*a* may thus include datasets 155 comprising data obtained from data sources 170 distributed across an enterprise computing environment or external to such an environment arriving at different time intervals and including data records associated with a time interval. Accordingly, a bootstrap dataset definition 153*a* for a corresponding data source 170 may define the characteristics of that data source 170 or data from that data source 170 and thus define how the data from that data source 170 is to be stored in the corresponding bootstrap dataset 155*a* that stores data from that data source 170. The bootstrap dataset definition 153*a* may include metadata 161*a* related to the source 170 from which the data of the corresponding bootstrap dataset 155*a* is to be obtained and a definition of a consistency time window 159*a* specifying a time (e.g., frequency, length, or interval) at which data will be received from the corresponding data source 170. In other words, the consistency window time may define the length of time or time interval (e.g., five minutes, eight minutes, 30 seconds, etc.) that may pass between receiving (or otherwise obtaining) data from that data source 170.

The bootstrap dataset definition 153*a* may also be associated with a data resolution time definition 157*a*, which defines the timing (e.g., the time between) the data records (events, data points, etc.) that will be included in the corresponding bootstrap dataset 155*a*. This data resolution 157*a* may be equal to or less than the consistency window time 159*a* defined for the bootstrap dataset 155*a*. In certain embodiments there may be a minimum data resolution time such as one minute or the like. Such a bootstrap dataset definition 153*a* may be defined by, for example, a user (e.g., a human or computer based (e.g., application)) user using an interface of the data analytics platform 101 (e.g., interface 122 of data analytics 122) or through host application of host application platform 171 and provided to the data analytics platform 101 (e.g., through interface 122 of data analytics 122).

Thus, when data arrives from a particular data source 170 at the data analytics platform (e.g., at a time interval), the data from that data source 170 can be stored in a corresponding bootstrap dataset 155*a* according to the bootstrap dataset definition 153*a* associated with that data source 170. Specifically, the bootstrap dataset 155*a* may include data from that data source 170 grouped or otherwise indexed according to the consistency window time (e.g., length or interval) 159*a* defined for that dataset 155*a* in the bootstrap dataset definition 153*a* defining the frequency at which data is received from the corresponding data source 170. These groupings of data records 152*a* are referred to as change sets 154*a*. Each change set 154*a* of a dataset 155*a* thus includes the data records 152*a* (events, data points, etc.) for that dataset 155*a* for each consistency window time (interval) 159*a* for the corresponding dataset 155*a*. The data records 152*a* received from the data source 170 in the data from the data source 170 received at each time interval (e.g., each consistency window time defined in the bootstrap dataset definition 153*a*) can be assigned to a change set 152*a*, for example, based on a timestamp 151 associated with the individual data record 152*a* (e.g., indicating the time at which the data of that data record was obtained or determined). Thus, typically, a change set 154*a* comprises the data (e.g., data records 152*a*) received (e.g., from the data source 170) at the expiration of each consistency window time interval as defined in the bootstrap dataset definition 153*a*. Such a change set 154 may thus include data for one or more consistency time window intervals.

Each change set 154*a* can thus be associated with a start or beginning time 156*a* (timestamp or other marker) of the time covered by that change set 154 (e.g., or the data records 152*a* included in that change set 154*a*) and an end time 158*a* (timestamp or other marker) of the time covered by that change set 154*a* (e.g., or the data records 152 included in that change set 154*a*, such as the timestamp 151 of the first data record 152*a*1 as the beginning time of the change set 154*a* and the timestamp of the last data record 152*a*2 as the end time of the change set), such that the time between the beginning time 156*a* and the end time 158*a* of the change set 152*a* is substantially equal to the consistency window time (as defined in the consistency window time definition 159*a*) for that dataset 155*a*. These change sets 154*a* may thus be considered a set of non-overlapping sets with respect to their beginning time 156*a* and end times 158*a*. These beginning and end times 156*a*, 158*a* for each change set 154*a* may be measured or defined relative to a clock or using an anchor time (e.g., a UNIX time, or Epoch or POSIX time, time since midnight of the current day, such that a time can be a combination of a date and time, etc.). As but one example, if a consistency window time for a dataset 155*a* is five minutes, the consistency windows (and thus the start times and end times for the respective change sets for that dataset) for every hour may be (0, 5], (5, 10], (10, 15], . . . (55, 60], etc. The data resolution time for the dataset thus could be between 1 to 5 minutes (e.g., depending on the data received at each five minute interval).

As these bootstrap datasets may include datasets comprising data determined from sensors 170 distributed across an enterprise computing environment the data of these bootstrap datasets may undergo transformations to produce data for other datasets, and serve as sources for generating data including metric values (e.g., data on a quantitative or qualitative measure or assessment). These metrics may thus be determined from one or more bootstrap datasets 155, other metrics, or intermediate data comprising data derived from one or more bootstrap datasets, metric data or other intermediate data. Such metrics may be defined by a user. Specifically, a metric may be defined by providing a metric definition including for example one or more source data datasets 155 to use for the metric, a transformation such as a parameter or function to be applied to the data from one or more of the source datasets, etc. Such a metric definition may be defined by, for example, a user (e.g., a human or computer based (e.g., application)) user using an interface of the data analytics platform 101 (e.g., interface 122 of data analytics 122) or through host application of host application platform 171 and provided to the data analytics platform 101 (e.g., through interface 122 of data analytics 122).

When such a metric is defined by a user, a metric dataset definition 153c may be created. Such a metric dataset definition 153c may include metadata 161 about its origin, including dataset dependencies 165 such as references to the source dataset(s) 155, or any target datasets 155, the transformation itself 163, or any parameter value that will be used to generate the corresponding metric dataset 155c storing metric values for that defined metric. The metric dataset definition 153c may also include a definition of a consistency time window 159c specifying a time (e.g., frequency, length, or interval) at which data (e.g., values) for the metric will be received (e.g., determined by data analytics 120). In other words, the consistency window time may define the length of time or time interval (e.g., five minutes, eight minutes, 30 seconds, etc.) that may pass between receiving (e.g., metric) data from a data source. The metric dataset definition 153c may also be associated with a data resolution time definition 157c, which defines the timing (e.g., the time between) the data records (events, data points, etc.) that will be included in the corresponding metric dataset 155c. This data resolution 157c may be equal to or less than the consistency window time 159c defined for the metric dataset 155c. In some cases, the data source for the data for the metric dataset 155c may be the data analytics platform 101 itself. For example, a dataset handler 126 of data analytics 120 may determine metric values according to a metric dataset definition 153c based on that definition (e.g., the consistency time window definition 159 or data resolution time 157 of that definition 153). For example, these metric values may be updated together according to the consistency time window definition 159 or the resolution time 157 such that users may have a consistent set of metric values regardless of any dimensional slicing or filtering.

Thus, when metric data associated with the metric dataset definition data arrives from a particular data source (e.g., determined by the data analytics platform at a time interval), the data from that data source can be stored in a corresponding metric dataset 155c according to the metric dataset definition 153c. As described above, the metric dataset 155c may include (e.g., metric) data from that data source grouped or otherwise indexed according to the consistency window time (e.g., length or interval) 159c defined for that dataset 155c in the metric dataset definition 153c defining the frequency at which data is received from the corresponding data source. Each change set 154c of a dataset 155c thus includes the data records 152c (events, data points, etc.) for that dataset 155c for each consistency window time (interval) 159c for the corresponding dataset 155c as described. The data records (e.g. metric values) 152c received at each time interval (e.g., each consistency window time defined in the bootstrap dataset definition 153c) can be assigned to a change set 152c based on an associated time 151 for that data record (e.g., indicating a time at which that metric value of the data record 152 was determined or a time when the metric value may otherwise apply).

Each change set 154c can thus be associated with a start or beginning time 156c (timestamp or other marker) of the time covered by that change set 154c (e.g., or the data records 152c included in that change set 154c) and an end time 158c (timestamp or other marker) of the time covered by that change set 154c (e.g., or the data records 152c included in that change set 154c, such that the time between the beginning time 156c and the end time 158c of the change set 152c is substantially equal to the consistency window time (as defined in the consistency window time definition 159c) for that dataset 155c. The start or beginning time 156c of the time covered by that change set 154c and an end time 158c of the time covered by that change set 154 may, or may not be, the same as the timestamp 151 of the first data record 152c1 as the beginning time of the change set 154c and the timestamp of the last data record 152c2 as the end time of the change set), In some cases, the start or beginning time 156 and end time 158 of a change set 154 may not match the first data record 152 and last data record 152, and may instead be the absolute start time and end time (e.g., an clock time or time since an anchor time or the like) of the fixed time window corresponding to the consistency time window.

Metric datasets 155c may be accessed quite frequently (e.g. metric datasets) and may thus be optimized for certain types of access or fast retrieval. Specifically, the datasets 155c may be persisted in a data store or materialized in cache where the data may be sufficiently denormalized in order to avoid having to rely on data external to the dataset itself to process the data of the dataset. Moreover, the metric dataset 155c may be partitioned and sub-partitioned into distinct sub-collections to further improve read performance. Such a dataset or the storage of the dataset may support queries with filtering conditions, rollups with aggregations and sorting, but no joins. Dimensions and filter attributes for the data of the dataset may be included so that the data (e.g., the supported metrics can be evaluated to get desired values).

As noted above, in addition to bootstrap datasets 155a comprising data from distributed sensors 170 and metric datasets 155c comprising metric data, data analytics platform 101 may utilize or determine one or more intermediate datasets 155b. These intermediate datasets 155b may include data derived from one or more bootstrap datasets 155a, metric datasets 155c or other intermediate datasets 155b. These intermediate datasets 155b may be used, for example, internal to data analytics platform 101 in the determination of metric datasets 155c or other intermediate datasets 155b. Thus, intermediate dataset definitions 153b and intermediate datasets 155b may be structured similarly to bootstrap datasets 155a or metric datasets 155c as described above.

Accordingly, an intermediate dataset definition 153b may include metadata 161 about its origin, including dataset dependencies 165 such as references to the source dataset(s) 155, or any target datasets 155, a transformation itself 163, or any parameter value that will be used to generate the corresponding intermediate dataset 155b storing the intermediate data. The intermediate dataset definition 153b may also include a definition of a consistency time window 159b specifying a time (e.g., frequency, length, or interval) at which data (e.g., values) for the intermediate data will be received (e.g., determined by data analytics 120). The intermediate dataset definition 153b may also be associated with a data resolution time definition 157b, which defines the timing (e.g., the time between) the data records (events, data points, etc.) that will be included in the corresponding intermediate dataset 155b. Thus, when intermediate data associated with the intermediate dataset definition 153b data arrives from a particular data source at the data analytics platform (e.g., at a time interval), the data from that data source can be stored in a corresponding intermediate dataset 155b according to the intermediate dataset definition 153b including by grouping such data (e.g., data records 152b) into change sets 154b with beginning time 156b and end time 158b.

Users of host application of host application platform 171 or data analytics platform 101 may desire to access the data in datasets 155. Accordingly, data analytics platform 101 may include a query processor 128 having an interface 134 (e.g., a RESTful interface, an API, etc.) that may be adapted to receive queries for data in datasets 155 (e.g., metric values) and return such data in response to the received query. In particular, a query may specify one or more metrics and data (e.g., values) for the one or more specified metrics may be returned in response to the query. A query may be received, for example, from a user directly (e.g., through a host application providing an interface for accessing analytics from data analytics platform 101) or may be received from host application platform 171 (e.g., in association with providing such analytics data through the associated host application).

Users of enterprise applications desire to be able to determine and receive such analytics data in an intuitive and simple manner, and may have certain expectations with respect to this analytics data. Specifically, one of the expectations that users of such an enterprise platform may have is that the data accessed (e.g., using embedded analytics in the host application platform) be consistent. In other words, that data presented together (e.g., in an interface) is from the same time (e.g., time or time period used here interchangeably) or corresponds to the same time. This is especially true for data (e.g., metrics) that are semantically related.

As can be imagined, however, in distributed architectures such as the one depicted, data may be continually arriving from (e.g., hundreds or even thousands of) a variety of different distributed sources within the computing network in real-time. Additionally, this data may be arriving asynchronously from these different distributed sources (e.g., at different consistency windows). Moreover, the data itself may include data collected over (or according to) different time intervals (e.g., data resolutions), and data analytics platform 101 may determine metrics values for metric datasets 155c or other datasets (e.g., intermediate datasets 155b) from the data (e.g., in bootstrap datasets 155a) received from these distributed sources at different time intervals and according to different data resolutions.

Both the real-time and asynchronous nature of the collection and determination of such distinct data streams and the real-time and asynchronous nature of distributed access to such analytics data, thus makes meeting the expectations of users with respect to the time alignment of accessed data extremely difficult. For example, three different datasets with dissimilar time intervals may only rarely (relatively speaking) be aligned (e.g., datasets having 7, 9 and 10 minute intervals may only be time aligned every 7*9*10=630 minutes, or 10.5 hours). For any dataset having relatively prime time intervals [w1, w2, . . . , wn], they may only be time aligned every w1*w2* . . . *wn. More generally, a group of datasets will only be time aligned align every LCM (Least Common Multiple) of all the time intervals at which those datasets are received (assuming the data resolution of the datasets equal the consistency time windows for those datasets).

To illustrate a simple example, an analytics platform may receive temperature data from one source at eight minute intervals where the temperature data includes temperatures measured every two minutes. Thus, every eight minutes the data analytics platform may receive eight minutes of data, with a two minute resolution (e.g., four temperature measurements, each taken two minutes apart, covering the eight minutes). The analytics platform may also receive humidity data from another source at nine minute intervals where the humidity data includes humidity values measured every three minutes, thus every nine minutes the data analytics platform receives nine minutes of data, with a three minute resolution (e.g., three humidity measurements, each taken three minutes apart covering the nine minutes).

Here, data alignment may be based on the dataset resolution provided that all involved datasets have consistent data at the aligned time. Continuing with the example above, the datasets in the example align at six minute intervals (2*3 the data resolutions of the respective datasets), however, at the first alignment time of 6 minutes (T6) the humidity data is incomplete (e.g., because its consistency time window is 9 minutes and data has not yet been received), therefore there is no alignment at T6. When the humidity data becomes complete at the ninth minute (T9, when data is received according to the consistency time window), there is alignment across the two datasets at minute six (T6). When another change set for temperature is received at minute 16 (T16 (2*8)), the second change set for humidity has not yet been received (according to the consistency time window), so the only alignment of the datasets at T16 remains at minute six (T6). By minute 18 (T18 (2*9)) however, the second change set for humidity has been received, so the datasets now align at T6 and minute 12 (T12). Continuing this pattern, at T27 the two datasets may align at T6, T12, T18, T24. As can be seen then, if a user requests both temperature and humidity data for a particular time (e.g., for a particular hour or the current time) it will be difficult to provide both humidity and temperature for the requested time. More generally, it will be difficult to provide time aligned temperature and humidity data (e.g., temperature and humidity data corresponding to the same time) at all.

Figure 2A:
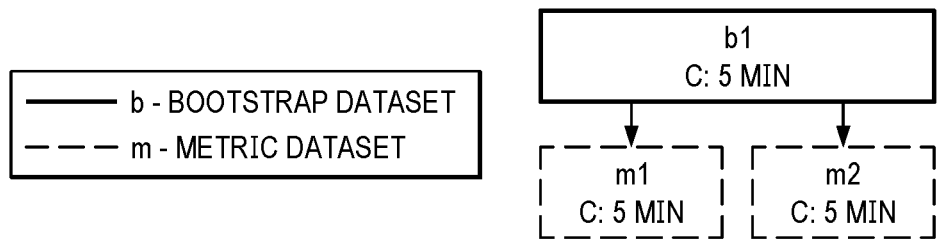
FIGS. 2A-2D are block diagrams of example datasets and their relationships.

It may be useful to discuss examples of this time consistency problem in more detail. Assume here for purposes of these examples that the consistency time windows for all the datasets are equal to their data resolution times. Referring then briefly to FIGS. 2A-2D (where processing times of datasets have not been shown or are understood to be minimal for ease of depiction), a simple example is depicted first in FIG. 2A is when two metric datasets (m1, m2) are based on the same bootstrap dataset (b1) and both the bootstrap dataset (b1) and the metric datasets (m1, m2) have the same consistency time window (e.g., C=5). In other words, data is received and determined at 5 minute intervals Here, these two metric datasets (m1, m2) are consistent with each other at any given time (e.g., if processing time for these datasets are ignored or are minimal), and if data is desired from each of the two metric datasets (m1, m2) it is straightforward to determine and return time aligned metric values from each of the two metric datasets (m1, m2).

Figure 2B:
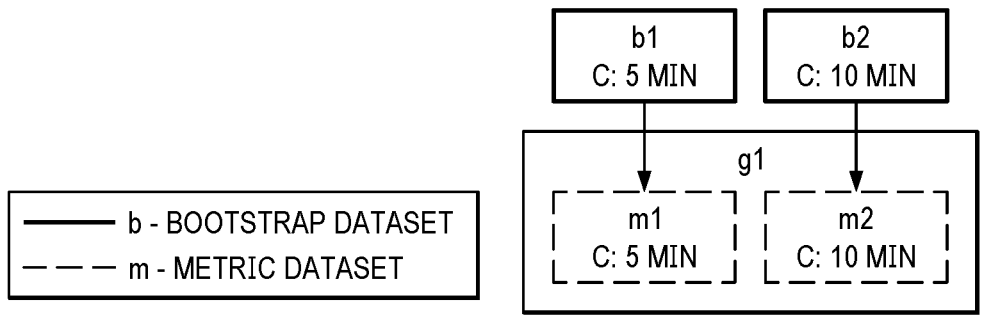

Turning to FIG. 2B, an example showing two metric datasets (m1, m2) with different consistency windows (5 minutes and 10 minutes, respectively) based on bootstrap datasets (b1, b2) with different consistency windows (5 minutes and 10 minutes, respectively), are depicted. Even though m1 may be updated every 5 minutes, if data from m1 and m2 are both desired and it is desired that the data for both metrics m1 and m2 be time alighted (e.g., from essentially the same time) data will not be available for metric value queries until m2 is updated as well, and the consistency windows of the two datasets m1 and m2 are aligned at 10-min intervals (e.g., if the dataset resolutions for those datasets are 5 and 10 minutes, respectively). Thus, if a desired time for time alignment does not fall on the 10 minute intervals it may be extremely difficult to provide time aligned metric values from these metric datasets (m1, m2).

Figure 2C:
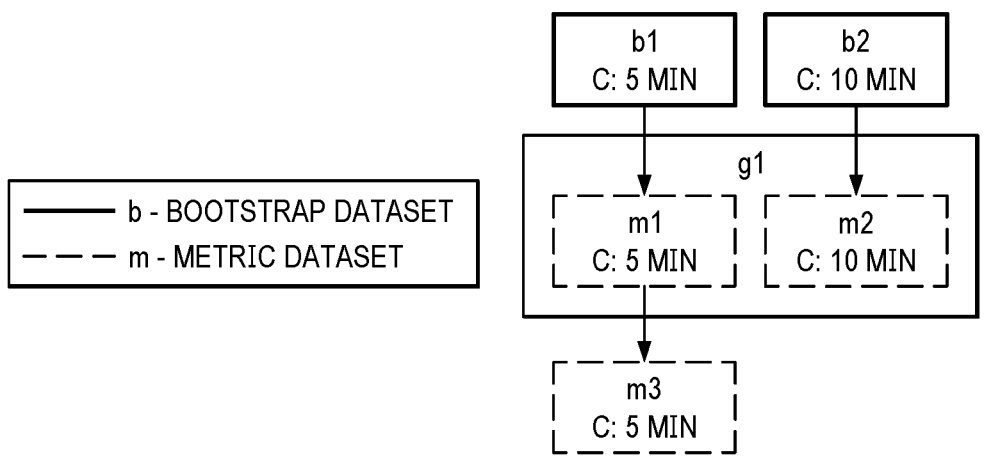

FIG. 2C depicts another example where two metric datasets (m1, m3) with the same consistency windows (5 minutes) are based on a bootstrap datasets (b1) with the same consistency windows (5 minutes) while another metric dataset (m2) with a different consistency window (10 minutes) is based on a bootstrap dataset (b2) with a consistency window of 10 minutes. Assume here for purposes of these examples that the consistency time windows for all the datasets are equal to their data resolution times. Here, metric datasets m1 and m3 are updated every 5 minutes in this case and the data in both (m1) and (m3) is available for metric queries in 5-minute intervals. Note however, that if it is desired to obtain data from metric dataset (m1) or metric dataset (m3) (or both) that is time aligned with data from metric dataset (m2) such data may only be aligned at 10 minute intervals. Thus, again, if a desired time for time alignment does not fall on the 10 minute intervals it may be extremely difficult to provide time aligned metric values from combinations of these metric datasets that include metric dataset (m3).

Figure 2D:
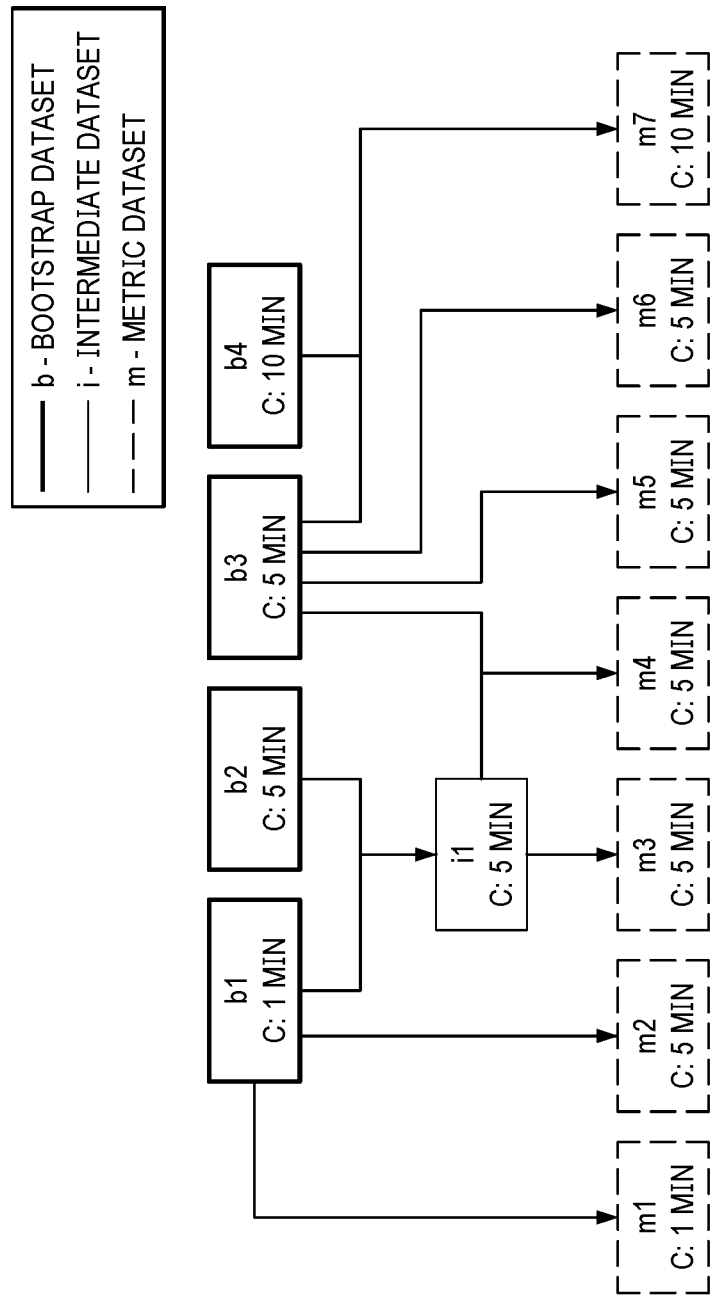

FIG. 2D depicts an example of a more complex dependency graph between bootstrap Datasets (bX), intermediate datasets (iX) and metric Datasets (mX). As new data becomes available in a dataset, downstream datasets need to be updated in order to reflect the changes due to the upstream data. Here, bootstrap dataset (b1) is updated at 1 minute consistency window time, bootstrap datasets (b2, b3) are updated at 5 minute consistency window times and bootstrap dataset (b4) is updated at a 10 minute consistency window time. Intermediate dataset (i1) can thus only be updated at a 5 minute consistency time window as it is dependent on bootstrap datasets (b1) and (b3), where (b2) is updated on a 5 minute consistency time window. Metric dataset (m1) may be updated on a 1 minute time interval, metric datasets m2, m3, m4, m5, and m6 may be updated on a 5 minute consistency time window and metric dataset (m7) may be updated on a 10 minute consistency time window. As can be seen then, it may be difficult to provide time aligned metric values from combination of these metric datasets that include any combination of these metric datasets that are not drawing exclusively from the group of those metric datasets that are updated on a 5 minute consistency window time (e.g., m2, m3, m4, m5 or m6) (again, where the consistency time windows for all the datasets are equal to their data resolution times).

As discussed above, however, users of enterprise applications may desire that accessed or presented data (e.g., using embedded analytics in the host application platform) be consistent with respect to time. In other words, these users desire that data presented together (e.g., in an interface) is from the same time (e.g., time or time period used here interchangeably) or corresponds to a same time. This is especially true for data (e.g., metrics) that are semantically related. Moreover, users may desire that values for data be deterministic, if one user gets metric (or other data values) for one particular (reference) time, another user can use the same reference time for the same metrics (or other data) and get the same values.

Figure 3:
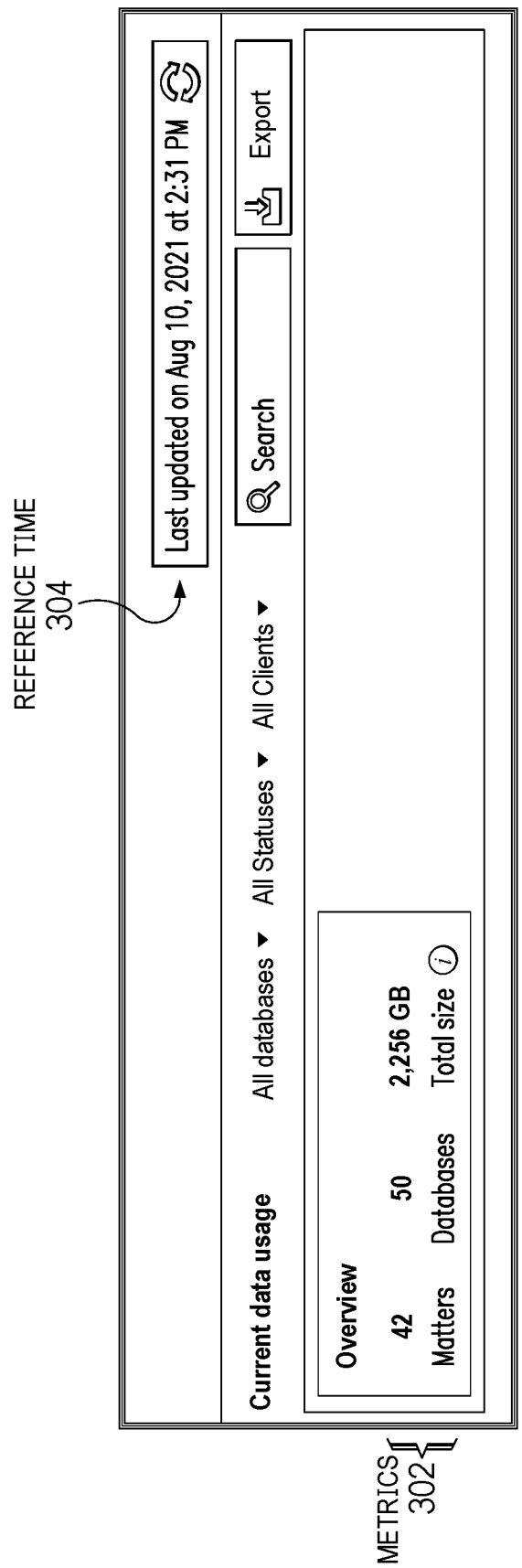
FIG. 3 is a block diagram of an example interface with time aligned metric data.

Such consistency can be better explained with reference to the example interface of a host application for document review presented in FIG. 3. Here, an interface is presenting three metrics 302, a number of matters included in a document review repository ("Matters"), a number of databases comprising documents ("Databases") (e.g., for the "Matters"), and the size of all those databases ("Total size"). As may be realized, it may be significantly less useful to the user viewing such metrics if those metrics are not time aligned. For example, if the "Databases" metric value is from three days ago and the "Total size" metric value is from yesterday the value of the "Total size" metric (2,256 GB) may not reflect the size of the number of databases in the "Databases" metric value (50). In other words, the number of "Databases" may have been greater or fewer yesterday when the size of all the databases was 2,256 GB as reflected in the "Total size" metric value. Similarly, the "Total size" of all the databases when there were 50 databases three days ago (e.g., as reflected in the "Databases" metric value) may have been greater or lesser than 2,256 GB. Complicating the analysis, imagine if the metric value for the "Matters" metric (42) was determined an hour ago. In this case, none of the values for those metrics may be correlated (e.g., time aligned) with one another. Consequently, a user viewing such an interface may have no idea what the current values for those metrics are and, importantly, if the values of those metrics are actually associated (e.g., if at the time there were 50 databases for 42 matters the total size of those databases was 2,256 GB).

To remedy this, embodiments may provide a query consistency or "reference" time 304 (in the example depicted Aug. 10, 2021, at 2:31 PM) in association with determined values metrics (e.g., that can be presented with those metrics) such that the values for the metrics associated with the query consistency time are time aligned to that query consistency time (i.e., all the values for the metrics associated with that query consistency time are current as of that query consistency time). Moreover, repeated queries with the same reference time 304 as the query time may produce the same metric values (e.g., assuming that data from the sensors is additive). In this manner, a user viewing the values for the displayed metrics can be assured that the displayed values for the metrics correspond to one another as of the presented reference time 304. Thus, for example, a user may interact with an interface to specify one or more metrics (or other data) and a query time. Such a query may identify one or more datasets (or data included therein) for the query, such as for example, a set of metrics, along with a query time from which such data is desired. If no specific query time is defined in the query a current time (e.g., of the query) may be utilized as the query time.

Returning to FIGS. 1A-1D, as discussed, data analytics platform 101 may include a query processor 128 having an interface 134 that may be adapted to receive these queries for data in datasets 155 (e.g., metric values) and return such data (e.g., metric values) in response to the received query. A query may be received, for example, from a user directly (e.g., through a host application providing an interface for accessing analytics from data analytics platform 101) or may be received from host application platform 171 (e.g., in association with providing such analytics data through the associated host application). A query may include one or more referenced datasets (e.g., metrics or other data) along with a query time specifying a time from which values from the specified datasets are desired.

Embodiments of query processor 128 may include data time consistent analyzer 132 to determine time aligned values of the requested data (e.g., metrics) and the associated reference time to return in response to the query. The returned reference time may, for example, be a time that is closest in time to the query time of the query where the values for the requested data (e.g., metrics) are time aligned. Thus, when the query time is a current time (or not specified) the reference time may be a most current time when the values for the requested data (metrics) are time aligned (e.g., a time when values for all the requested data have been received and stored). This reference time can then be returned in a response to the query along with the values for the requested data (metrics) at that reference time. Specifically, query processor 128 may leverage the format in which the datasets 155 are stored (e.g., comprising timestamped change sets 154 associated with a consistency window time 159 including timestamped data records associated with a data resolution time 157) to determine such values and an associated reference time.

In one embodiment, data time consistent analyzer 132 can determine the query time from the query. This determination may include converting the query time into the same time format as the format of the times associated with the change sets 154 or data records 152 (e.g., a UNIX time, or Epoch or POSIX time, time since midnight of the current day, such that a time can be a combination of a date and time, etc.). The data time consistent analyzer 132 can then determine the datasets 155 associated with data (e.g., metrics) referenced in the query (e.g., the metric datasets 155c associated with the metrics referenced in the received query).

The data time consistent analyzer 132 can then determine a closest time to the query time for which all the referenced datasets 155 have change sets 154 that encompass that time (e.g., where the query time falls between the begin time 156 and the end time for that change set 154). Generally, data time consistent analyzer 132 may determine a closest time to the query time for which there exist change sets 154 for each dataset (e.g., metric) referenced in the query. The data time consistent analyzer 132 can iterate through the change sets 154 of each referenced dataset or determine the most current time (or closest time to the query time) for which data exists in a change set 154 for all referenced datasets. The closest time to the query time that is time aligned with a least common multiple of the consistency time window definitions 159 for each dataset for which all these determined change sets 154 have data records 152 can then be used as the reference time for the query response. Values from the data records 152 corresponding to this reference time from each of the determined change sets 154 for each dataset referenced in the query can then be returned in response to the query in association with the reference time.

In one embodiment, to determine a reference time, a closest consistency time to the query time of the query can be determined for each referenced dataset 155. This closest consistency time for a dataset 155 may be determined in one embodiment by dividing the query time (e.g., converted into minutes, such as minutes since some anchor time such as midnight of the current day) by the consistency window time 159 of that dataset to yield a change set index value indicating a change set 154 that will include a data record 152 from a closest time to the query time. Specifically, the change set index value indicates the number of a change set 154a received since the anchor time. Thus for example, if the change set index of "x" (e.g., 7), it will be the "x"th (e.g., $7^{th}$) change set 155 received since the reference time that would include the closest consistency time for that dataset 155.

The closest consistency time for each of the referenced datasets 155 can then be determined for the query time based on the determined change set (e.g. index) for that dataset 155 and the consistency window time 159. For example, the defined consistency window time 159 can then be multiplied by the index value for the determined change set 154 to determine the end time 158 of the change set 154 (e.g., or the end time 158 of the change set 154 may be accessed to determine such a closest consistency time for the dataset 155).

If the closest consistency times for each dataset are time aligned (e.g., are the same time or within some tolerance), this closest consistency time can then be used as the reference time for the query response. Values from the data records 152 corresponding to this reference time from each of the determined change sets 154 for each dataset referenced in the query can then be returned in response to the query in association with the reference time.

Otherwise, the data resolution times for each of the referenced datasets may then be used to determine the reference time. Specifically, the referenced dataset with the most recent time (e.g., closest time) to the query time can be determined. Time can be subtracted from this closest consistency time for that referenced dataset in increments of the defined data resolution time 157 for that referenced dataset 155 to generate a new closest reference time for that referenced dataset. This subtraction of time in increments of the defined data resolution time 157 may continue until the closest consistency time of the reference dataset is earlier or equal distance from (e.g., previous too or farther way from) the query time than the closest consistency time for the other referenced datasets 155 of the query.

If the closest consistency times for each referenced dataset of the query are now time aligned (e.g., the same time or within some tolerance of one another), this closest consistency time can then be used as the reference time for the query response. Values from the data records 152 corresponding to this reference time from each of the determined change sets 154 for each dataset 155 referenced in the query can then be returned in response to the query in association with the reference time.

If, however, the closest consistency times for the referenced datasets 155 are still not time aligned, the process of determining the reference dataset 155 whose closest consistency time is the most recent time (e.g., closest time) to the query time and subtracting the defined data resolution time 157 for that dataset 155 from this closest consistency time in increments of the defined data resolution time 157 for that referenced dataset 155 to generate a new closest reference time for that referenced dataset 155 may be continued. Again, this subtraction of time in increments of the defined data resolution time 157 may continue until the closest consistency time of that referenced dataset 155 is earlier or equal distance from (e.g., previous too or farther way from) the query time than any other closest consistency time for the other referenced datasets 155 of the query.

This process can be repeated until the closest consistency times for the referenced datasets 155 are time aligned. At this point, the aligned closest consistency time can be used as the reference time for the query response. Values from the data records 152 corresponding to this reference time from each of the determined change sets 154 for each dataset 155 referenced in the query can then be returned in response to the query in association with the reference time.

Figure 4A:
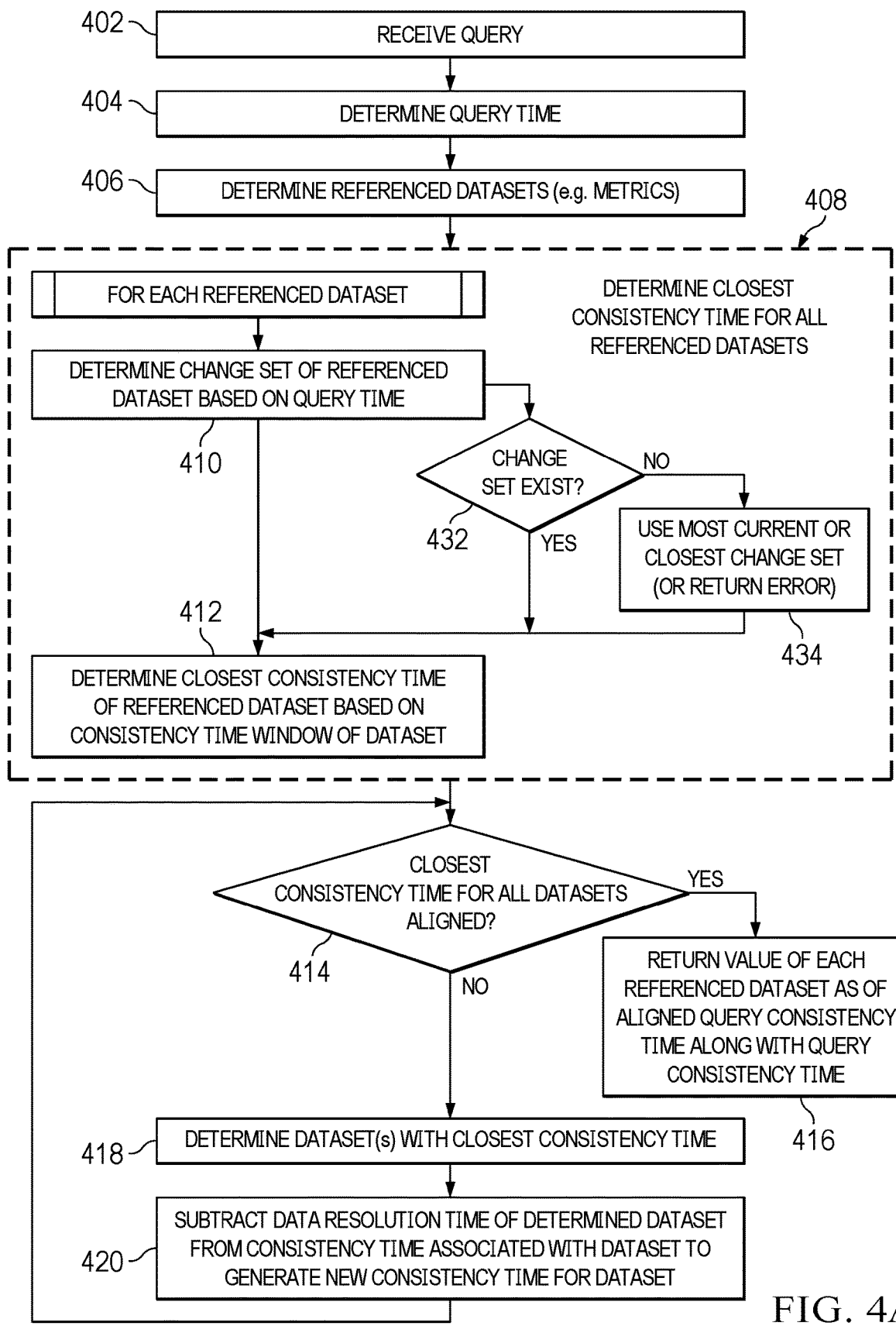
FIGS. 4A and 4B are flow diagrams of embodiments of methods for determining time aligned data.

Looking briefly at FIG. 4A, a flow diagram of one embodiment of a method for determining time aligned values of datasets in response to a query is depicted. A query may be received (STEP 402), for example, from a user directly (e.g., through a host application providing an interface for accessing analytics) or may be received from a host application platform (e.g., in association with providing such analytics data through the associated host application). Such a query may include one or more referenced datasets (e.g., metrics or other data) along with a query time specifying a time from which values from the specified datasets are desired.

The query time can be determined from the received query (STEP 404). This determination may include converting the query time into the same time format as the format of the times associated with the change sets or data records (e.g., a UNIX time, or Epoch or POSIX time, time since midnight of the current day, such that a time can be a combination of a date and time, etc.).

From this query time, one or more time aligned values of the requested data (e.g., metrics or other datasets specified in the query) and the associated reference time to return in response to the query may be determined. The returned reference time may, for example, be a time that is closest in time to the query time of the query where the values for the requested data (e.g., metrics or other datasets) are time aligned (e.g., a most current time when values for the all the requested data exist). Thus, when the query time is a current time (or not specified) the reference time may be a most current time when the values for the requested data (e.g., metrics) are time aligned. This reference time can then be returned in a response to the query along with the values for the requested data (metrics) at that reference time. As discussed above, embodiments of the format in which datasets are stored (e.g., comprising timestamped change sets associated with a consistency window time including timestamped data records associated with a data resolution time) may be leveraged to determine such values and an associated reference time.

Datasets associated with data (e.g., metrics) referenced in the query (e.g., the metric datasets associated with the metrics referenced in the received query) may also be determined (STEP 406). A closest time to the query time that is time aligned with a least common multiple of the consistency time window definitions for each dataset for which all these determined change sets have data records can then be used as the reference time for the query response. Values from the data records corresponding to this reference time from each of the determined change sets for each dataset referenced in the query can then be returned in response to the query in association with the reference time.

In one embodiment, to determine the reference time to return in response to the query, a closest consistency time to the query time of the query can be determined for each dataset referenced in the query (STEP 408). To determine this closest consistency time for a particular referenced dataset, a change set of the referenced dataset based on the query time may be determined (STEP 410), where this change set may include data (e.g., data records) for that referenced dataset most closely associated with (e.g., closest in time to) the query time. Such a change set may be determined embodiment by dividing the query time (e.g., converted into minutes, such as minutes since some anchor time such as midnight of the current day) by the consistency window time of that dataset to yield a change set index value indicating a change set that will include a data record from a closest time to the query time. Specifically, the change set index value indicates the number of a change set received since the anchor time. Thus for example, if the change set index value of "x" (e.g., 7) it will be the "x"th (e.g., $7^{th}$) change set received since the reference time that would include the closest consistency time for that dataset. If this change set (referenced by the index value) doesn't exist (N branch of STEP 432) a change set (or index value of a change set) of the dataset that is associated with a time that is closest in time to the query time may be determined and utilized (or an error may be returned in response to the query) (STEP 434).

The closest consistency time for each of the referenced datasets can then be determined for the query time based on the determined change set (e.g. index) for that dataset and the consistency window time for that dataset (STEP 412). For example, the defined consistency window time for the dataset can then be multiplied by the index value for the determined change set to determine the end time of the change set (e.g., or the end time of the change set may be accessed to determine such a closest consistency time for the dataset).

Once the closest consistency times to the query time have been determine for each dataset referenced in the query, it can be determined if these closest consistency times for each dataset are time aligned (e.g., are the same time or within some tolerance) (STEP 414). If these closest consistency times are time aligned (Y branch of STEP 414), this closest consistency time can then be used as the reference time for the query response. Values from the data records corresponding to this reference time from each of the determined change sets for each dataset referenced in the query can then be returned in response to the query in association with the reference time (STEP 416).

Otherwise (N branch of STEP 414), the data resolution times for each of the datasets referenced in the query may then be used to determine the reference time. Specifically, the referenced dataset with the most recent time (e.g., closest time) to the query time can be determined (STEP 418). Time can be subtracted from this closest consistency time for that referenced dataset in increments of the defined data resolution time for that referenced dataset to generate a new closest reference time for that referenced dataset (STEP 420). This subtraction of time in increments of the defined data resolution time may continue until the closest consistency time of the reference dataset is earlier or equal distance from (e.g., previous too or farther away from) the query time than the closest consistency time for the other referenced datasets of the query.

If the closest consistency times for each referenced dataset of the query are now time aligned (e.g., the same time or within some tolerance of one another) (STEP 414), this closest consistency time can now be used as the reference time for the query response. Values from the data records corresponding to this reference time from each of the determined change sets for each dataset referenced in the query can then be returned in response to the query in association with the reference time (STEP 416).

If, however, the closest consistency times for the referenced datasets are still not time aligned (N branch of STEP 414), the process of determining the reference dataset whose closest consistency time is the most recent time (e.g., closest time) to the query time and subtracting the defined data resolution time for that dataset from this closest consistency time in increments of the defined data resolution time for that referenced dataset to generate a new closest reference time for that referenced dataset 155 may be continued (STEPS 418, 420). Again, this subtraction of time in increments of the defined data resolution time may continue until the closest consistency time of that referenced dataset is earlier or equal distance from (e.g., previous too or farther away from) the query time than any other closest consistency time for the other referenced datasets of the query.

This process (determining the referenced dataset with a closest consistency time and subtracting of time in increments of the data resolution time for that dataset, STEPS 418, 420) can be repeated until the closest consistency times for the referenced datasets are time aligned. At this point, the aligned closest consistency time can be used as the reference time for the query response. Values from the data records corresponding to this reference time from each of the determined change sets for each dataset referenced in the query can then be returned in response to the query in association with the reference time (STEP 416).

Moving back to FIGS. 1A-1D, in another embodiment data time consistent analyzer 132 may decide to determine time aligned values of the requested data (e.g., metrics) and the associated reference time to return in response to the query based on the least common multiple of the data resolutions of the datasets specified by the query. Here, data time consistent analyzer 132 can determine the query time from the query. This determination may include converting the query time into the same time format as the format of the times associated with the change sets 154 or data records 152 if needed. The data time consistent analyzer 132 can then determine the datasets 155 associated with data (e.g., metrics) referenced in the query (e.g., the metric datasets 155*c* associated with the metrics referenced in the received query).

The data time consistent analyzer 132 can then determine the data resolution time definition 157 (the data resolution time) for each of the datasets 155 referenced in the query. Based on these data resolution times for each of the datasets 155 the data time consistent analyzer 132 can determine a running time (e.g., in the time format) corresponding to a least common multiple of the data resolution times of the datasets 155. Thus, the determined running time may be a time from an anchor time that falls along a time boundary corresponding to the least common multiple of the data resolution times for each dataset, where that running time is the closest (in time) running time to the query time that is previous to the query time. For example, if the query time is for two datasets the have a respective time resolution of two minutes and three minutes, the running times for such datasets may fall at six minute intervals since an anchor time (e.g., 00:06, 00:12, 00:18, 00:24, 00:30, 00:36, 00:42, 00:48, 00:54, 01:00, 01:06, 01:12, etc.). If a query time is 1:10, a running time for those two datasets may be 01:06.

Once the running time is determined, the data time consistent analyzer 132 can determine if the change sets 154 for the datasets 155 referenced in the query encompass that time (e.g., where the query time falls between the begin time 156 and the end time for that change set 154) and include data for that running time. If every dataset 155 referenced in the query has data for the determined running time, the datasets 155 are considered consistent as of that running time. This running time can then be used as the reference time for the query response. Values from the data records 152 corresponding to this running time from each of the determined change sets 154 for each dataset 155 referenced in the query can then be returned in response to the query in association with the reference time.

If, however, any dataset 155 referenced in the query does not have a change set 154 for the determined running time (or the change set 154 does not have data for the determined running time), the datasets are not considered consistent as of the running time. In this case, the running time is adjusted (e.g., backward) by the least common multiple of the data resolutions (e.g., a time corresponding to the least common multiple of the data resolution of the datasets is subtracted from the current running time to generate a new running time). That new running time may thus be a time from an anchor time that falls along a time boundary corresponding to the least common multiple of the data resolution times for each dataset, where that new running time is the closest (in time) running time to the current running time that is previous to the current running time. Continuing with the above example, if a current running time for two datasets that have a respective time resolution of two minutes and three minutes is 1:06, a new running time may be 1:00 (e.g., 1:06 current running time minus the six minute least common multiple of the two and three minute time resolutions).

Once the running time is determined, the data time consistent analyzer 132 can determine if the change sets 154 for the datasets 155 referenced in the query encompass that time (e.g., where the query time falls between the begin time 156 and the end time for that change set 154) and include data for that running time. If every dataset 155 referenced in the query has data for the determined running time, the datasets 155 are considered consistent as of that running time. This running time can then be used as the reference time for the query response. Values from the data records 152 corresponding to this running time from each of the determined change sets 154 for each dataset 155 referenced in the query can then be returned in response to the query in association with the reference time. The adjustment of the running time can continue in this manner until a consistent running time is found, or the earliest change set 154 for one of the referenced datasets 155 is reached.

Figure 4B:
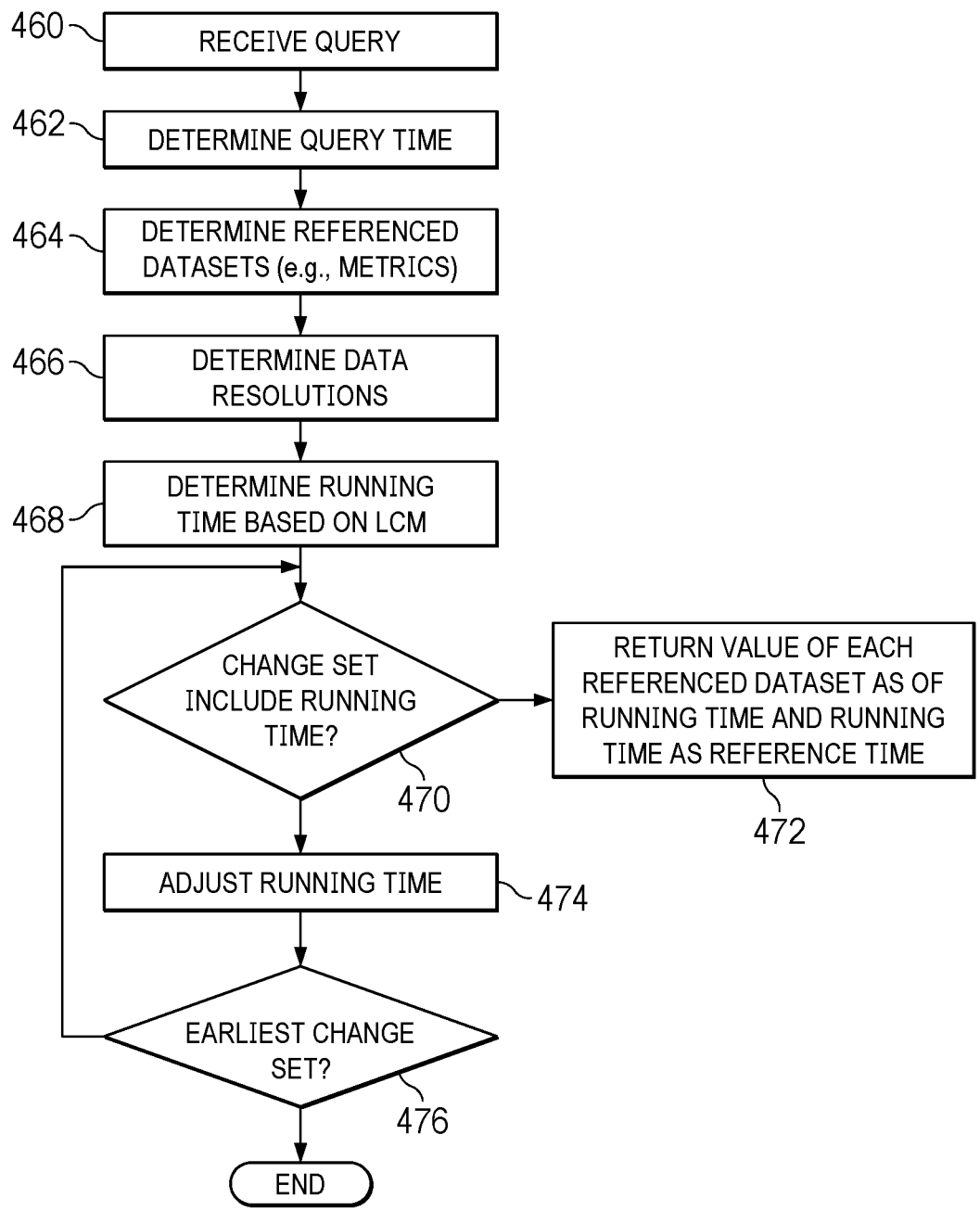

FIG. 4B depicts a flow diagram of another embodiment of a method for determining time aligned values of datasets in response to a query. A query may be received (STEP 460), for example, from a user directly (e.g., through a host application providing an interface for accessing analytics) or may be received from a host application platform (e.g., in association with providing such analytics data through the associated host application). Such a query may include one or more referenced datasets (e.g., metrics or other data) along with a query time specifying a time from which values from the specified datasets are desired.

The query time can be determined from the received query (STEP 462). This determination may include converting the query time into the same time format as the format of the times associated with the change sets or data records (e.g., a UNIX time, or Epoch or POSIX time, time since midnight of the current day, such that a time can be a combination of a date and time, etc.). This determination may include converting the query time into the same time format as the format of the times associated with the change sets or data records if needed.

From this query time, one or more time aligned values of the requested data (e.g., metrics or other datasets specified in the query) and the associated reference time to return in response to the query may be determined. The returned reference time may, for example, be a time that is closest in time to the query time of the query where the values for the requested data (e.g., metrics or other datasets) are time aligned (e.g., a most current time when values for the all the requested data exist). Initially query time from the query. The datasets associated with data (e.g., metrics) referenced in the query (e.g., the metric datasets associated with the metrics referenced in the received query) can then be determined (STEP 464).

The data resolution time definition (the data resolution time) for each of the datasets referenced in the query can then be determined (STEP 466). Based on these data resolution times for each of the datasets a running time (e.g., in the time format) corresponding to a least common multiple of the data resolution times of the datasets can be determined (STEP 468). Thus, the determined running time may be a time from an anchor time that falls along a time boundary corresponding to the least common multiple of the data resolution times for each dataset, where that running time is the closest (in time) running time to the query time that is previous to the query time. For example, if the query time is for two datasets the have a respective time resolution of two minutes and three minutes, the running times for such datasets may fall at six minute intervals since an anchor time (e.g., 00:06, 00:12, 00:18, 00:24, 00:30, 00:36, 00:42, 00:48, 00:54, 01:00, 01:06, 01:12, etc.). If a query time is 1:10, a running time for those two datasets may be 01:06.

Once the running time is determined, it can be determined if the change sets for the datasets referenced in the query encompass that time (e.g., where the query time falls between the begin time and the end time for that change set) and include data for that running time (STEP 470). If every dataset referenced in the query has data for the determined running time (Y branch of STEP 470), the datasets are considered consistent as of that running time. This running time can then be used as the reference time for the query response. Values from the data records corresponding to this running time from each of the determined change sets for each dataset referenced in the query can then be returned in response to the query in association with the reference time (STEP 472).

If, however, any dataset referenced in the query does not have a change set for the determined running time (or the change set does not have data for the determined running time) (N branch of STEP 470), the datasets are not considered consistent as of the running time. In this case, the running time is adjusted (e.g., backward) by the least common multiple of the data resolutions (e.g., a time corresponding to the least common multiple of the data resolution of the datasets is subtracted from the current running time to generate a new running time) (STEP 474). That new running time may thus be a time from an anchor time that falls along a time boundary corresponding to the least common multiple of the data resolution times for each dataset, where that new running time is the closest (in time) running time to the current running time that is previous to the current running time. Continuing with the above example, if a current running time for two datasets that have a respective time resolution of two minutes and three minutes is 1:06, a new running time may be 1:00 (e.g., 1:06 current running time minus the six minute least common multiple of the two and three minute time resolutions).

Once the new running time is determined (STEP 474), it can again be determined if the change sets for the datasets referenced in the query encompass that time (e.g., where the query time falls between the begin time and the end time for that change set) and include data for that running time If every dataset referenced in the query has data for the determined running time (Y branch of STEP 470), the datasets are considered consistent as of that running time. This running time can then be used as the reference time for the query response. Values from the data records corresponding to this running time from each of the determined change sets for each dataset referenced in the query can then be returned in response to the query in association with the reference time (STEP 472). The adjustment of the running time (STEP 474) can continue in this manner until a consistent running time is found (Y branch of STEP 470), or the earliest change set for one of the referenced datasets is reached (STEP 476). In some cases, an error may be returned if an earliest change set is reached without finding a running time where data is included in a change set for dataset referenced in the originally received query.

Figure 5:
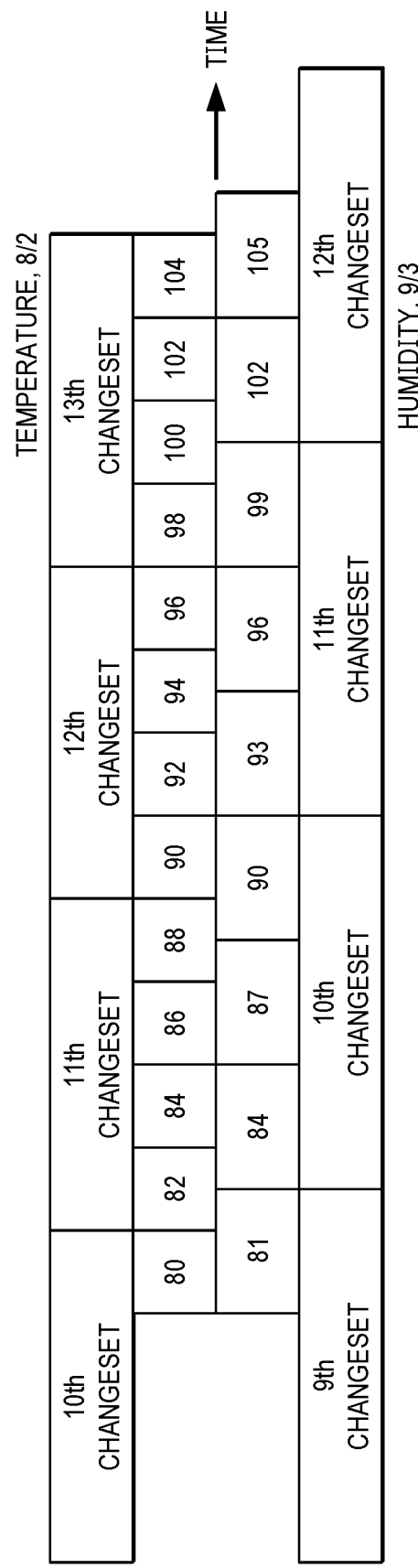
FIG. 5 is a block diagram of the processing of example datasets to provide time aligned data.

It may add to an understanding of embodiments to illustrate an example of such a determination with respect FIG. 5. Assume for purposes of this example, that a data analytics platform receives two asynchronous feeds of weather data from one or more data sources. This weather data is for two datasets. A temperature dataset for temperature data (temperature values at different times) and a humidity dataset for humidity data (humidity values at different times).

Continuing with the example, for temperature data, a batch of four data records is received at a time, every eight minutes. Thus, the consistency time window for the temperature dataset is eight minutes. So every $8^{th}$ minute, the data analytics platform receives data including one temperature data record for the end of 2nd, 4th, 6th, and 8th minutes of that 8 minute period, 4 data records in total. Thus, the data resolution for the temperature dataset is 2 minutes. An example of a temperature record may be 00:06, 96F indicating that at the $6^{th}$ minute since an anchor time (e.g., time since midnight of a day, etc.) the temperature was 96 degrees Fahrenheit.

Thus, each change set for the temperature dataset will encompass 8 minutes of temperature data records, and include 4 data records associated with every two minutes of that 8 minute interval. As such, a first change set (e.g., having an index value of 1) of the temperature dataset since the anchor time will be associated with a beginning time of 0:01 (e.g., since the anchor time of 0:00) and an end time of 8:00 (e.g., since the anchor time) and includes data records having temperature values for 2:00, 4:00, 6:00 and 8:00 (e.g., a first data record having a timestamp of 2:00 and a temperature value, a second data record having a timestamp of 4:00 and a temperature value, etc.), a second change set (having an index value of 2) of the temperature dataset since the anchor time will be associated with a beginning time of 8:01 (e.g., since the anchor time of 0:00) and an end time of 16:00 (e.g., since the anchor time) and includes data records having temperature values for 10:00, 12:00, 14:00 and 16:00 (e.g., a first data record having a timestamp of 10:00 and a temperature value, a second data record having a timestamp of 12:00 and a temperature value, etc.), etc.

Assume for the purpose of this example that for humidity data a batch of three data records is received at a time, every nine minutes. Thus, the consistency time window for the humidity dataset is nine minutes. So every $9^{th}$ minute, the data analytics platform receives data including one humidity data record for the end of 3rd, 6th, and 9th minutes of that 9 minute period, 3 data records in total. Thus, the data resolution for the humidity dataset is 3 minutes. An example of a humidity record may be 00:12, 40% indicating that at the $12^{th}$ minute since an anchor time (e.g., time since midnight of a day, etc.) the humidity was 40%

Thus, each change set for the humidity dataset will encompass 9 minutes of humidity data records, and include 3 data records associated with every three minutes of that 9 minute interval. As such, a first change set (e.g., having an index value of 1) of the humidity dataset since the anchor time will be associated with a beginning time of 0:01 (e.g., since the anchor time of 0:00) and an end time of 9:00 (e.g., since the anchor time) and includes data records having humidity values for 3:00, 6:00 and 9:00 (e.g., a first data record having a timestamp of 3:00 and a humidity value, a second data record having a timestamp of 6:00 and a temperature value, etc.), a second change set (having an index value of 2) of the humidity dataset since the anchor time will be associated with a beginning time of 9:01 (e.g., since the anchor time of 0:00) and an end time of 18:00 (e.g., since the anchor time) and includes data records having temperature values for 12:00, 15:00, and 18:00 (e.g., a first data record having a timestamp of 12:00 and a temperature value, a second data record having a timestamp of 15:00 and a temperature value, etc.), etc. It will be desired, of course, for a data analytics platform to report consistent (time aligned) historical temperature and humidity data based on queries for specific dates and times, like "What was the weather like at 1:30 am of Jan. 1, 2022".

Assume for purposes of this example that a data analytics platform started receiving such temperature and humidity data from the start of Jan. 1, 2022 (midnight on Jan. 1, 2022, the anchor time), and the data analytics platform receives a query for temperature and humidity data at a time of 1:30 am Jan. 1, 2022 (for this example the query time will be the current time of 1:30 am Jan. 1, 2022). It will be understood that queries previous to that time may return data that is time consistent (e.g., for a query at 00:10 am, ten minutes after data was being received for the datasets, a query consistency time will be at 00:06 am because one change set for both datasets has been received, etc.). However, for purposes of this example assume that the query time for this example is 1:30 am.

Then, by 1:30 am (90 minutes from the start of day) the data analytics platform will have received the following number of change sets: For temperature, the 90 minutes since the anchor time (e.g., the query time of 1:30 am represented 90 minutes since the anchor time of 0:00 of the current day or year, etc.) divided by the 8 minute consistency time window for the temperature dataset yields a change set index value of 11. Moreover, this $11^{th}$ change set of the temperature dataset has data until minute 88 (the 11 (change set index number) multiplied times the 8 minute consistency time window yields 88 minutes of data). This determined value (in this example 88 minutes) can be labeled the "ct_t" (or the closest consistency time of the temperature dataset).

Similarly, for the humidity dataset by 1:30 am (90 minutes from the start of day) the data analytics platform will have received a number of change sets for the humidity dataset. Specifically, for humidity, the 90 minutes since the anchor time (e.g., the query time of 1:30 am represented 90 minutes since the anchor time of 0:00 of the current day or year, etc.) divided by the 9 minute consistency time window for the humidity dataset yields a change set index value of 10. Moreover, this 10th change set of the humidity dataset has data until minute 90 (the 10 (change set index number) multiplied times the 9 minute consistency time window yields 90 minutes of data)). This determined value (in this example 90 minutes) can be labeled the "ct_h" (or the closest consistency time of the humidity dataset).

As such, we cannot return the results for 1:30 am exactly because the determined consistency times for the temperature dataset and humidity dataset (e.g., closest to the query time of 1:30) are not the same (e.g., temperature data has data only until the 88th minute while the humidity dataset has data for the 90th minute).

So to align the consistency times for each of the temperature and humidity datasets and determine a reference time and associated data to return in response to the query, the data analytics platform can determine the dataset with the closest consistency time (in this case the humidity dataset with 90 minutes) and subtract from the higher (closest) consistency time (ct_h) the data resolution for corresponding dataset (here 3 minutes) until ct_h<=ct_t to determine a new consistency time (ct_h) for the humidity dataset. At that point, if the new consistency time for the humidity data ct_h=ct_t (the consistency times of the temperature dataset) that consistency time (e.g., the aligned consistency times ct_h and ct_t corresponding to each dataset and having substantially the same value) can be used as the reference time for the query and the aligned consistency time can be used as the reference time for the query response. Values from the data records corresponding to this reference time from each of the humidity and temperature datasets can then be determined and returned in response to the query in association with the reference time.

In this example the data analytics platform subtracts the data resolution time (3) from the current closest consistency time (ct_h=90) for the humidity dataset until it is less than or equal to the consistency time (ct_t=88) for the temperature dataset. Here, 90 (ct_h)–3 (data resolution for the humidity dataset) is 87 which is less than the consistency time (ct_t=88) of the temperature dataset so the data analytics platform stops subtracting the data resolution time (3 minutes) of the humidity dataset from the consistency time (ct_h) of the humidity dataset and the new consistency time (ct_h) of the humidity dataset is now (ct_h=87) which is not equal to the consistency time (ct_t=88) of the temperature dataset.

Thus, at this point the data analytics platform can then determine the dataset having the closest associated consistency time to the query time. Here, the closest consistency time to the query time (90 minutes) is now the consistency time of the temperature dataset (ct_t=88) which is closer than the consistency time of the humidity dataset (ct_h=87). As such, the data analytics platform will subtract from the higher (closest) consistency time (ct_t=88) the data resolution for the corresponding dataset (here 2 minutes) until ct_t<=ct_h to determine a new consistency time (ct_t) for the temperature dataset.

Here, 88 (ct_t)–2 (data resolution for the temperature dataset) is 86 which less than the consistency time (ct_h=87) of the humidity dataset so the data analytics platform stops subtracting the data resolution time (2 minutes) of the temperature dataset from the consistency time (ct_t) of the temperature dataset and the new consistency time (ct_t) of the temperature dataset is now (ct_t=86) which is not equal to the consistency time (ct_h=87) of the humidity dataset.

As the consistency times associated with each of the humidity and temperature datasets are not aligned at this point, the data analytics platform can then determine the dataset having the closest associated consistency time to the query time. Here, the closest consistency time to the query time (90 minutes) is now the consistency time of the humidity dataset (ct_h=87) which is closer than the consistency time of the temperature dataset (ct_t=86). As such, the data analytics platform will subtract from the higher (closest) consistency time (ct_h=87) the data resolution for the corresponding dataset (here 3 minutes) until ct_h<=ct_t to determine a new consistency time (ct_h) for the humidity dataset.

In this example the data analytics platform subtracts the data resolution time (3) from the current closest consistency time (ct_h=87) for the humidity dataset until it is less than or equal to the current consistency time (ct_t=86) for the temperature dataset. Here, 87 (ct_h)−3 (data resolution for the humidity dataset) is 84 which is less than the current consistency time (ct_t=84) of the temperature dataset so the data analytics platform stops subtracting the data resolution time (3 minutes) of the humidity dataset from the consistency time (ct_h) of the humidity dataset and the new consistency time (ct_h) of the humidity dataset is now (ct_h=84) which is not equal to the current consistency time (ct_t=86) of the temperature dataset.

As the consistency times (ct_t=86 and ct_h=84) associated with each of the humidity and temperature datasets are not aligned at this point, the data analytics platform can then determine the dataset having the current closest associated consistency time to the query time. Here, the closest consistency time to the query time (90 minutes) is now the consistency time of the temperature dataset (ct_t=86) which is closer than the consistency time of the humidity dataset (ct_h=84). As such, the data analytics platform will subtract from the higher (closest) consistency time (ct_t=86) the data resolution for the corresponding dataset (here 2 minutes) until ct_t<=ct_h to determine a new consistency time (ct_t) for the temperature dataset.

Here, 86 (ct_t)−2 (data resolution for the temperature dataset) is 84 which is less than or equal to the consistency time (ct_h=84) of the humidity dataset so the data analytics platform stops subtracting the data resolution time (2 minutes) of the temperature dataset from the consistency time (ct_t) of the temperature dataset and the new consistency time (ct_t) of the temperature dataset is now (ct_t=84) which is now equal to the consistency time (ct_h=84) of the humidity dataset.

Thus, the 84$^{th}$ minute since the anchor time represents the closest time to the query time (90$^{th}$ minute since the anchor time) that the humidity dataset and the temperature dataset ore time aligned. Accordingly, the 84th minute since the anchor time can be used as the reference time for the query and this aligned consistency time can be used as the reference time for the query response. Values from the data records corresponding to this reference time (84th minute since the anchor time) can be obtained from each of the humidity and temperature datasets and returned in response to the query in association with the reference time.

For example, data for both datasets based on all, or a subset of, the data records that arrived up to minute 84 (or 1:24 am) may be utilized in determining data values for each dataset (e.g., metric) to return in response to the query. For temperature, this may mean that the data analytics platform takes the temperature from the second data record of the 11$^{th}$ change set–change set 10 gets us has until 10*8=80 minutes, and the response may utilize a record from the 11$^{th}$ change set to get temperature data corresponding to minute 84 since the anchor time. For humidity, the data analytics platform may obtain data from the 1st record of the 10th change set (e.g., change set 9 includes data from the 9*9=81 minutes, so the data analytics platform needs to access one more data record from the 10th change set to get a humidity value for the 84th minute.

It may be noted that the results for this query (e.g., temperature and humidity metric values for 1:30 am) change when 12th change set arrives for temperature data at 1:36 am. At this point the data analytics platform may have temperature records till 96 minute, and humidity records until 90th minute, and the data analytics platform can align both of these metrics on the 90th minute. Namely at the 1st record of the 12th change set of the temperature dataset, and the 3$^{rd}$ record of the 10$^{th}$ change set of the humidity dataset.

Thus, when a query is received at 1:30-1:35 am, identifying the metrics of humidity and temperature and having a query time of 1:30 the results returned in response to the query may be based on data records from 1:24 am records. However, if this query is received later (e.g., the query time is at 1:36 am or later), results returned in response to the query may be based on data records from 1:30 am. This is due to the fact that the data analytics platform received enough temperature data by 1:36 am to be able to report the data as of 1:30 am.

Generally then, a data analytics platform may select consistency times as either the latest available change set consistency times, or, when available, the first change set consistency times that are greater than the requested query time, and then apply an embodiment of the alignment method as discussed to those times based on the data resolution times for each dataset.

Figure 6A:
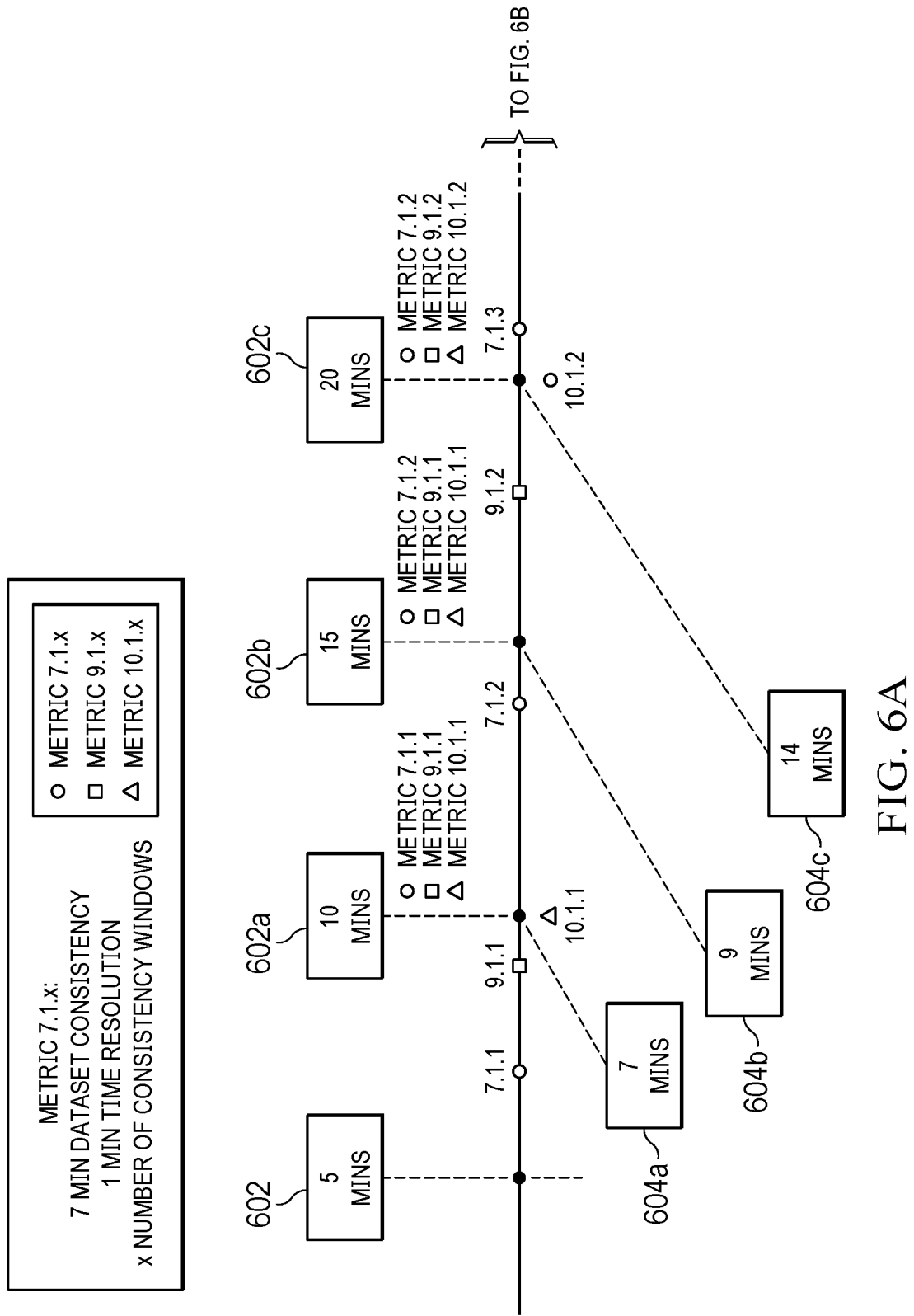

Another example is depicted in FIGS. 6A and 6B. In this example, there are three metric dataset, where a first metric dataset has a 7 minute consistency window and a 1 minute data resolution, a second metric dataset has a 9 minute consistency window and a 1 minute data resolution and a third metric dataset has a 10 minute consistency window and a 1 minute data resolution. Each change set of each metric dataset is designated as "consistency window time of the dataset.data resolution of the dataset.number of change set received since the start of an anchor time (0:00) (the change set index value)". Thus, the first dataset is designated as 7.1.x (where x is the index value of the change set), the second dataset is designated as 9.1.x (where x is the index value of the change set) and the third dataset is designated as 10.1.x (where x is the index value of the change set). The time elapsed since the anchor time (e.g., the time the system has been processing) is designated by time indicators 602. Thus, these datasets may be naturally time aligned at processing time of 630 minutes 602f since the anchor time, as the is the least common multiple of the first dataset time resolution 7 minutes, the second dataset time resolution 9 minutes and the third dataset time resolution 10 minutes (7*9*10=630). At this point 90 change sets will have been received for the first dataset, 70 change sets will have been received for the second dataset and 63 change sets will have been received for the third dataset.

As can be seen, at the processing time of 10 minutes 602a only one change set has been received for each dataset, thus after 10 minutes these three datasets can only be time aligned 604a at a 7 minute reference time 604a, as data from the first dataset 7.1.x has only been received up to the 7 minute mark (e.g., at the 10 minute mark the data analytics platform has 7.1.1, 9.1.1 and 10.1.1). At a processing time of 15 minutes 602b however, as another change set (7.1.2) has been received from the first dataset, these datasets can now be time aligned at the 9 minute mark 604b, as the 9.1.1 change set is the most current data available for the 9.1.x dataset. At a processing time of 20 minutes 602c as another change set (9.1.2) has been received from the second dataset and another change set (10.1.2) has been received from the third dataset, these datasets can now be time aligned at the 14 minute mark 604*c*, as the 7.1.2 change set is the most current data available for the 7.1.x dataset and includes the least recent data of all datasets (e.g., from 14 minutes since the anchor time). At a processing time of 25 minutes 602*d* as another change set (7.1.3) has been received from the first dataset these datasets can now be time aligned at the 18 minute mark 604*d*, as the 9.1.2 change set is the most current data available for the 9.1.x dataset and includes the least recent data of all datasets (e.g., from 18 minutes since the anchor time). At a processing time of 30 minutes 602*e* as another change set (7.1.4) has been received for the first dataset, another change set (9.1.3) has been received for the second dataset and another change set has been received for the third dataset (10.1.3), these datasets can now be time aligned at the 27 minute mark 604*e*, as the 9.1.3 change set is the most current data available for the 9.1.x dataset and includes the least recent data of all datasets (e.g., from 27 minutes since the anchor time).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A data analytics system, comprising:
a processor;
a data store, comprising:
a plurality of dataset definitions, each dataset definition including a consistency time window and a data resolution, wherein the consistency time window defines a first time interval at which data for a corresponding dataset is received from a corresponding data source associated with the dataset and the data resolution defines a second time interval between one or more data records included in the data received from the data source at the first time interval, and wherein each of the data records includes a value;

a plurality of datasets, each dataset corresponding to one of the plurality of dataset definition; and a non-transitory computer readable medium comprising instructions for:

for each dataset:
receiving data from the data source corresponding to the dataset at the first time interval, the data comprising one or more data records at the second time interval;
storing the one or more received data records in the received data in change sets of the dataset, the change sets associated with a beginning time and an end time;

receiving a query comprising a query time, the query associated with the plurality of datasets;

evaluating, by a query processor software module, all of the plurality of datasets to determine a reference time for the plurality of datasets based on the query time, the consistency time window of each dataset, and the data resolution of each dataset, wherein the reference time is a time that is closest in time to the query time of the query where the values for the plurality of datasets are time aligned;

determining, by a query processor software module, the value of each dataset at the reference time from the data record of that dataset associated with the reference time; and returning the value of each dataset at the reference time and the reference time in response to the query.

2. The system of claim 1, wherein the consistency time window and the data resolution are different time intervals.

3. The system of claim 1, wherein at least one corresponding data source comprises a data analytics application.

4. The system of claim 1, wherein at least one of the corresponding data sources is associated with a host application provided by a host application platform.

5. The system of claim 1, where evaluating all of the plurality of datasets to determine a reference time for the plurality of datasets based on the query time comprises determining a consistency time for each dataset based on the query time and adjusting the consistency times for each dataset by the data resolution for that dataset until the consistency times for each dataset are time aligned.

6. The system of claim 5, wherein determining the consistency time for each dataset comprises determining the change set of each dataset that comprises data closest in time to the query time and determining the consistency time for the dataset based on the determined change set.

7. A method, comprising:
storing a plurality of dataset definitions, each dataset definition including a consistency time window and a data resolution, wherein the consistency time window defines a first time interval at which data for a corresponding dataset is received from a corresponding data source associated with the dataset and the data resolution defines a second time interval between one or more data records included in the data received from the data source at the first time interval, and wherein each of the data records includes a value;

storing a plurality of datasets, each dataset corresponding to one of the plurality of dataset definition, comprising:

for each dataset:
receiving data from the data source corresponding to the dataset at the first time interval, the data comprising one or more data records at the second time interval, and storing the one or more received data records in the received data in change sets of the dataset, the change sets associated with a beginning time and an end time;

receiving a query comprising a query time, the query associated with the plurality of datasets;

evaluating, by a query processor software module, all of the plurality of datasets to determine a reference time for the plurality of datasets based on the query time, the consistency time window of each dataset, and the data resolution of each dataset, wherein the reference time is a time that is closest in time to the query time of the query where the values for the plurality of datasets are time aligned;

determining, by a query processor software module, the value of each dataset at the reference time from the data record of that dataset associated with the reference time; and returning the value of each dataset at the reference time and the reference time in response to the query.

8. The method of claim 7, wherein the consistency time window and the data resolution are different time intervals.

9. The method of claim 7, wherein at least one corresponding data source comprises a data analytics application.

10. The method of claim 7, wherein at least one of the corresponding data sources is associated with a host application provided by a host application platform.

11. The method of claim 7, where evaluating all of the plurality of datasets to determine a reference time for the plurality of datasets based on the query time comprises determining a consistency time for each dataset based on the query time and adjusting the consistency times for each dataset by the data resolution for that dataset until the consistency times for each dataset are time aligned.

12. The method of claim 11, wherein determining the consistency time for each dataset comprises determining the change set of each dataset that comprises data closest in time to the query time and determining the consistency time for the dataset based on the determined change set.

13. A non-transitory computer readable medium, comprising instructions for:
storing a plurality of dataset definitions, each dataset definition including a consistency time window and a data resolution, wherein the consistency time window defines a first time interval at which data for a corresponding dataset is received from a corresponding data source associated with the dataset and the data resolution defines a second time interval between one or more data records included in the data received from the data source at the first time interval, and wherein each of the data records includes a value;

storing a plurality of datasets, each dataset corresponding to one of the plurality of dataset definition, comprising:

for each dataset:
receiving data from the data source corresponding to the dataset at the first time interval, the data comprising one or more data records at the second time interval, and storing the one or more received data records in the received data in change sets of the dataset, the change sets associated with a beginning time and an end time;

receiving a query comprising a query time, the query associated with the plurality of datasets;

evaluating, by a query processor software module, all of the plurality of datasets to determine a reference time for the plurality of datasets based on the query time, the consistency time window of each dataset, and the data resolution of each dataset, wherein the reference time is a time that is closest in time to the query time of the query where the values for the plurality of datasets are time aligned;

determining, by a query processor software module, the value of each dataset at the reference time from the data record of that dataset associated with the reference time; and returning the value of each dataset at the reference time and the reference time in response to the query.

14. The non-transitory computer readable medium of claim 13, wherein the consistency time window and the data resolution are different time intervals.

15. The non-transitory computer readable medium of claim 13, wherein at least one corresponding data source comprises a data analytics application.

16. The non-transitory computer readable medium of claim 13, wherein at least one of the corresponding data sources is associated with a host application provided by a host application platform.

17. The non-transitory computer readable medium of claim 13, where evaluating all of the plurality of datasets to determine a reference time for the plurality of datasets based on the query time comprises determining a consistency time for each dataset based on the query time and adjusting the consistency times for each dataset by the data resolution for that dataset until the consistency times for each dataset are time aligned.

18. The non-transitory computer readable medium of claim 17, wherein determining the consistency time for each dataset comprises determining the change set of each dataset that comprises data closest in time to the query time and determining the consistency time for the dataset based on the determined change set.

* * * * *